(12) United States Patent
Lu et al.

(10) Patent No.: US 12,309,140 B2
(45) Date of Patent: May 20, 2025

(54) METHOD AND SYSTEM FOR COMMUNICATION BETWEEN SERVER AND AUTHENTICATOR

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

(*) Notice: Subject to any disclaimer, the term of this patent is extended or adjusted under 35 U.S.C. 154(b) by 208 days.

(21) Appl. No.: 18/034,683

(22) PCT Filed: Nov. 4, 2021

(86) PCT No.: PCT/CN2021/128650
§ 371 (c)(1),
(2) Date: Apr. 29, 2023

(87) PCT Pub. No.: WO2022/142717
PCT Pub. Date: Jul. 7, 2022

(65) Prior Publication Data
US 2023/0396606 A1    Dec. 7, 2023

(30) Foreign Application Priority Data
Dec. 31, 2020  (CN) .......................... 202011619754.7

(51) Int. Cl.
*H04L 9/40*     (2022.01)
*H04L 9/08*     (2006.01)

(52) U.S. Cl.
CPC .......... *H04L 63/083* (2013.01); *H04L 9/0869* (2013.01)

(58) Field of Classification Search
CPC ..... H04L 63/083; H04L 9/0869; H04L 9/321; H04L 9/3273; H04L 9/0861;
(Continued)

(56) References Cited

U.S. PATENT DOCUMENTS

| 8,713,087 B2 * | 4/2014 | Yamato | H04L 47/824 709/200 |
| 2002/0016922 A1 * | 2/2002 | Richards | G06F 21/31 726/3 |

(Continued)

*Primary Examiner* — Badri Narayanan Champakesan
(74) *Attorney, Agent, or Firm* — J. Clinton Wimbish; Maynard Nexsen PC

(57) ABSTRACT

A method for communication between a server and an authenticator. The method comprises: a server generating a first client identifier, a first authenticator identifier and a first session key according to a request sent by a client, and broadcasting, by means of the client, data comprising the first client identifier; an authenticator scanning the broadcast data, acquiring a third key to verify the first client identifier, if verification is successful, generating a second authenticator identifier and a second session key, making a notification of the successful verification, stopping scanning, and broadcasting broadcast data comprising the second authenticator identifier; the client stopping broadcasting, and scanning the broadcast data sent by the authenticator, acquiring and verifying the second authenticator identifier in the broadcast data, and if verification is successful, establishing a Bluetooth connection with the authenticator; and the client performing handshake and encrypted communication operation with the authenticator. By means of the present invention, data not being stolen during a transmission process can be ensured, thereby improving the data security during the transmission process, and ensuring the interests of a user.

20 Claims, 9 Drawing Sheets

(58) Field of Classification Search
CPC ............... H04L 9/3239; H04L 63/0428; H04L 63/0869; H04L 63/0876; H04W 4/80; H04W 12/02; H04W 76/14
USPC ............................................................ 726/7
See application file for complete search history.

(56) References Cited

U.S. PATENT DOCUMENTS

| | | | |
|---|---|---|---|
| 2005/0050322 A1* | 3/2005 | Mizrah | ................... H04L 63/08 713/168 |
| 2005/0050328 A1* | 3/2005 | Mizrah | ................. H04L 9/0844 713/171 |
| 2008/0320302 A1* | 12/2008 | Pilant | .................... H04L 9/0838 713/161 |
| 2015/0095649 A1* | 4/2015 | Johnson | .............. H04L 63/0227 713/171 |
| 2020/0028696 A1* | 1/2020 | Malluru | ................. G06F 21/606 |

\* cited by examiner

METHOD AND SYSTEM FOR COMMUNICATION BETWEEN SERVER AND AUTHENTICATOR

TECHNICAL FIELD

The present invention relates to a method for communicating between a server and an authenticator and a system thereof, which belongs to communicating technology field.

PRIOR ART

In prior art, a client builds connection with an authenticator via Bluetooth pairing and the client and the authenticator obtains encrypting key via negotiation in process of building connection, data is transmitted in ciphertext in communicating process by using the encrypting key. However, in the communicating way above, whether the encrypting key obtained by negotiation between the authenticator and the client or a seed key involved in the negotiation is stored at the client, therefore data stored at the client is not secure, which will lead to fact that sensitive data such as key, and the like, is stolen. The data transmitted in communicating process will not be protected safely.

SUMMARY OF THE INVENTION

The object of the present invention is to provide a method for making communication between a server and an authenticator and a system therefor, which ensures that data is not be stolen in transmission process and improves security of data in the transmission process.

Thus, according to one aspect of the present invention, a method for communicating between a server and an authenticator is provided. The method is adapted to a system including a client, an authenticator and a server. The method including the following steps:

Step S1) The sends a request for budding session data to the server;

Step S2) the server obtains a first key corresponding to the client stored in the server, generates a first client identification and a first authenticator identification according to the first key, obtains a second key corresponding to the first key, generates a first session key according to the second key, sends the first client identification, the first authenticator identification and the first session key to the client;

Step S3) the client broadcasts data including the first client identification according to a preset time interval regularly;

Step S4) the authenticator scans broadcast data, obtains the first client identification in the broadcast data, obtains a third key stored in the authenticator, verifies the first client identification according to the third key, if verifying is successful, execute Step 105, if verifying is failed, rescan broadcast data;

Step S5) the authenticator generates a second authenticator identification according to the third key, obtains a fourth key corresponding to the third key, generates a second session key according to the fourth key, notifies that verifying the first client identification is successful, stops scanning and broadcasts broadcast data including a second authenticator identification;

Step S6) the client stops broadcasting, starts scanning the broadcast data sent from the authenticator, parses the broadcast data obtained by scanning to obtain the second authenticator identification, verifies the second authenticator identification, if verifying is successful, build Bluetooth connection with the authenticator, execute Step S7, if verifying is failed, procedure is end;

Step S7) the client performs operation with the first session key to obtain a first handshake key, performs operation on the client data with the first handshake key to obtain a client data digest value, sends a handshake command including the client data and the client data digest value;

Step S8) the authenticator obtains the client data and the client data digest value according to the handshake command, performs operation with the second session key to obtain a second handshake key, verifies the client data according to the second handshake key, the client data and the client data digest value, if verifying is successful, perform operation on the authenticator data with the second handshake key to obtain an authenticator data digest value, send the handshake response including the authenticator data and the authenticator data digest value to the client;

Step S9) the client obtains the authenticator data and the authenticator data digest value according to the handshake response, verifies the authenticator data according to the first handshake key, the authenticator data and the authenticator data digest value, if verifying is successful, handshake is successful, execute S10; otherwise, perform disconnecting;

Step S10) the client performs operation with the first session key to obtain a first encrypting key, performs operation on operating data with the first encrypting key to obtain cipher data, sends an operating command including the cipher data to the authenticator;

Step S11) the authenticator obtains the cipher data in the operating command, obtains a second encrypting key by performing operation with the second session key, decrypts the cipher data with the second encrypting key to obtain operating data, performs corresponding operation corresponding to the operating data to obtain an operating result data; performs operation on the operating result data with the second encrypting key to obtain an operating response data, sends an operating response including response data to the client.

According to another aspect of the present invention, a system for communicating between a server and an authenticator is provided. The system including: a client, a server and an authenticator;

In this case, the client includes: a first sending module configured to send a request for building session data to the server.

The server includes:
a first obtaining module configured to obtain a first key stored by itself which is corresponding to the client;
a first generating module configured to generate a first client identification and a first authenticator identification according to the first key;
the first obtaining module further configured to obtain a second key corresponding to the first key;
a second generating module configured to generate a first session key according to the second key;
a second sending module configured to send the first client identification, the first authenticator identification and the first session key to the client.

The client further includes:
a first broadcasting module configured to broadcast data including the first client identification at a regular preset time period;

a first scanning and parsing module configured to stop broadcasting, start scan broadcast data sent from the authenticator, parse the broadcast data obtained by scanning;

a first verifying module configured to verify the second authenticator identification;

a third generating module configured to obtain a first handshake key via the first session key, perform operation on client data via the first handshake key to obtain a client data digest value;

the first sending module further configured to send a handshake command including the client data and the client data digest value to the authenticator;

a second obtaining module configured to obtain the authenticator data and an authenticator data digest value according to a handshake response;

a second verifying module configured to verify the authenticator data via the first handshake key, the authenticator data and the authenticator data digest value;

an encrypting processing module configured to obtain a first encrypting key by performing operation via the first session key, perform operation on operating data via the first encrypting key to obtain cipher data;

the first sending module further configured to send an operating command including the cipher data to the authenticator.

The authenticator includes:

a second scanning module configured to scan broadcast data, obtain the first client identification from the broadcast data a third obtaining module configured to obtain a third key stored by itself;

a third verifying module configured to verify the first client identification according to the third key;

a fourth generating module configured to generate a second authenticator identification according to the third key;

a third obtaining module further configured to obtain a fourth key corresponding to the third key;

a fifth generating module configured to generate a second session key according to a fourth key;

a notifying module configured to notify that verifying the first client identification is successful;

a second broadcasting module configured to stop scanning and broadcast broadcast data including the second authenticator identification;

a third obtaining module further configured to obtain the client data and the client data digest value according to the handshake command;

a sixth generating module configured to obtain second handshake key via the second session key;

a fourth verifying module configured to verify the client data according to the second handshake key, the client data and the client data digest value;

the seventh generating module configured to perform operation on the authenticator data via the second handshake key to obtain the authenticator data digest value;

a third sending module configured to send a handshake response including the authenticator data and the authenticator data digest value to the client;

the third obtaining module configured to obtain cipher data in the operating command;

an eighth generating module configured to perform operation via the second session key to obtain a second encrypting key;

the decrypting and processing module configured to decrypt the cipher data via the second encrypting key to obtain operating data, perform operation corresponding to the operating data to obtain operating result data, performs operation on the operating result data via the second encrypting key to obtain operating response data;

the third sending module further configured to send an operating response including operating response data to the client.

According to the present invention, based on Bluetooth connection between devices, the server generates session data via a stored negotiated key and sends the session data to the client; the client and the authenticator build a Bluetooth pairing connection at an application level, perform bidirectional broadcast and scanning authentication in connecting process; an encrypting key is generated via the session key generated by the server after successful authentication and connection; data in communicating process is encrypted and transferred in communicating process via the encrypting key which assures that data during a transferring process will not be stolen. By adapting the method provided in the present invention, data security is improved in transferring process and a benefit of user is assured.

DESCRIPTION OF EMBODIMENTS

The technical solutions the present disclosure will be clearly and completely described in the following with reference to the accompanying drawings of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of the present disclosure.

Embodiment 1

According to Embodiment 1 of the present invention, a method for communicating between a server and an authenticator is provided. The method is adapted to a system including a client, an authenticator and a server, the client is an application installed on a mobile terminal with Bluetooth function.

Figure 1:
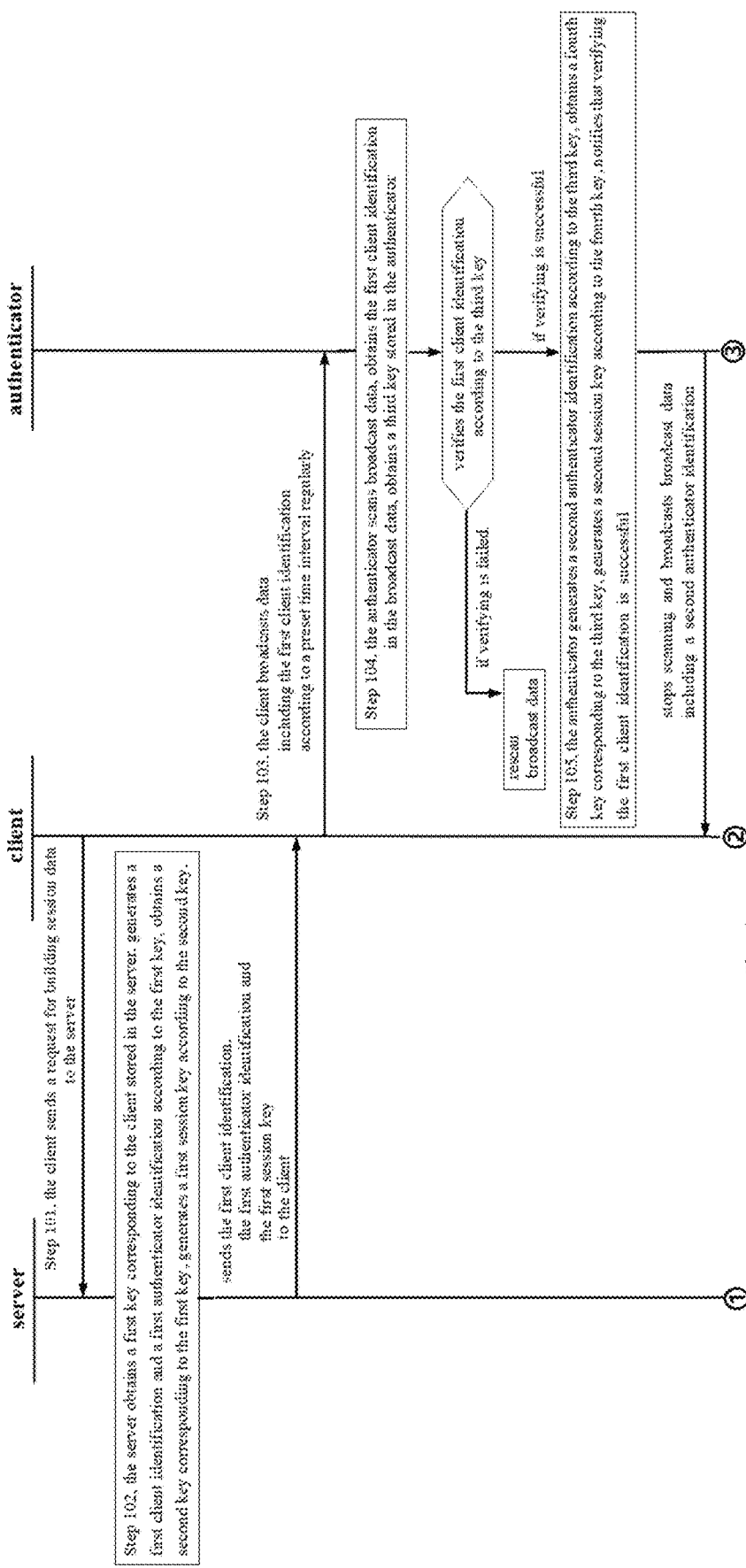
FIG. 1 is a flow chart of a method for communicating between a server and an authenticator provided by Embodiment 1 of the present invention.
Figure 1:
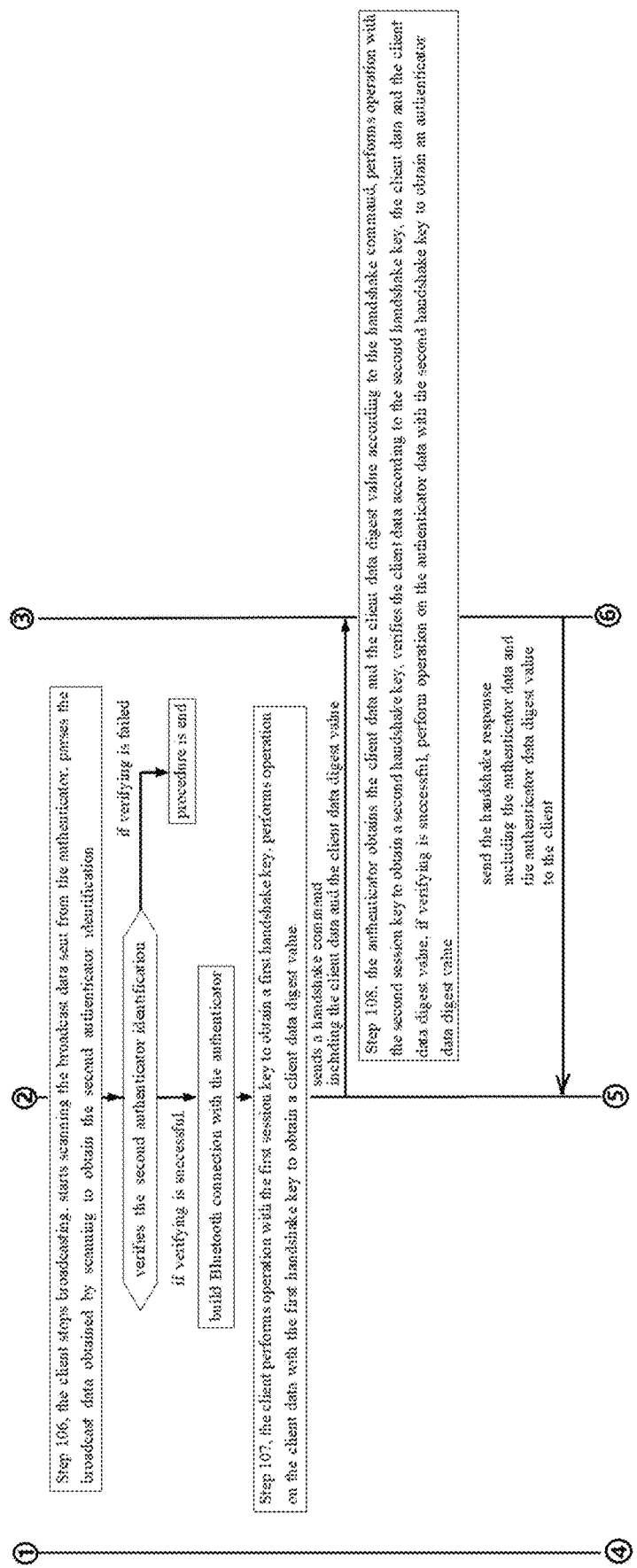
Figure 1:
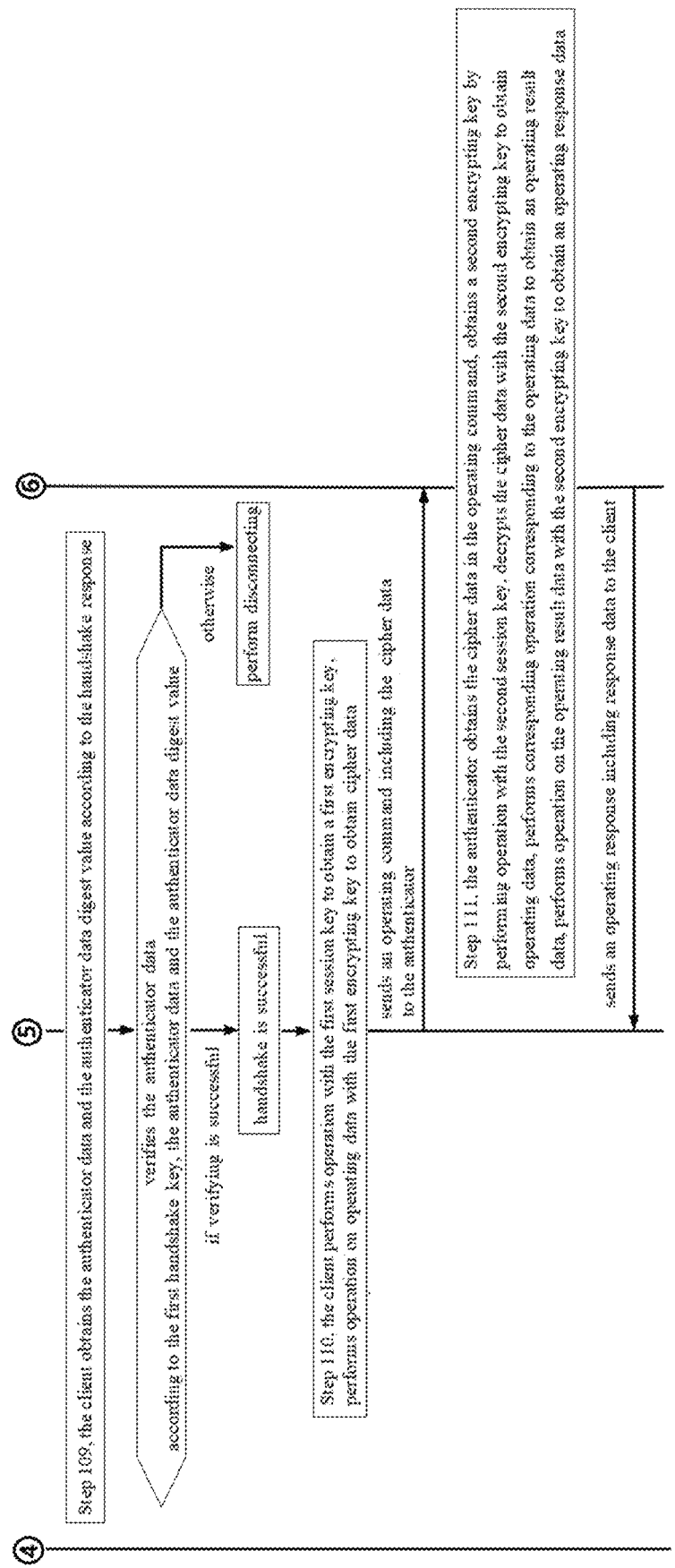

As shown in FIG. 1, the present method includes the following steps.

Step 101, the client sends a request for building session data to the server.

Step 102, the server obtains a first key corresponding to the client stored in the server, generates a first client identification and a first authenticator identification according to the first key, obtains a second key corresponding to the first key, generates a first session key according to the second key, and sends the first client identification, the first authenticator identification and the first session key to the client.

Step 103, the client broadcasts data including the first client identification according to a preset time interval regularly.

Step 104, the authenticator scans broadcast data, obtains the first client identification in the broadcast data, obtains a third key stored in the authenticator, verifies the first client identification according to the third key, if verifying is successful, execute Step 105, if verifying is failed, rescan broadcast data.

Step 105, the authenticator generates a second authenticator identification according to the third key, obtains a fourth key corresponding to the third key, generates a second session key according to the fourth key, notifies that verifying the first client identification is successful, stops scanning and broadcasts broadcast data including a second authenticator identification.

Step 106, the client stops broadcasting, starts scanning the broadcast data sent from the authenticator, parses the broadcast data obtained by scanning to obtain the second authenticator identification, verifies the second authenticator identification, if verifying is successful, build Bluetooth connection with the authenticator, execute Step 107, if verifying is failed, procedure is end.

Step 107, the client performs operation with the first session key to obtain a first handshake key, performs operation on the client data with the first handshake key to obtain a client data digest value, sends a handshake command including the client data and the client data digest value.

Step 108, the authenticator obtains the client data and the client data digest value according to the handshake command, performs operation with the second session key to obtain a second handshake key, verifies the client data according to the second handshake key, the client data and the client data digest value, if verifying is successful, perform operation on the authenticator data with the second handshake key to obtain an authenticator data digest value, send the handshake response including the authenticator data and the authenticator data digest value to the client.

Step 109, the client obtains the authenticator data and the authenticator data digest value according to the handshake response, verifies the authenticator data according to the first handshake key, the authenticator data and the authenticator data digest value, if verifying is successful, handshake is successful, execute Step 110; otherwise, perform disconnecting.

Step 110, the client performs operation with the first session key to obtain a first encrypting key, performs operation on operating data with the first encrypting key to obtain cipher data, sends an operating command including the cipher data to the authenticator.

Step 111 the authenticator obtains the cipher data in the operating command, obtains a second encrypting key by performing operation with the second session key, decrypts the cipher data with the second encrypting key to obtain operating data, performs corresponding operation corresponding to the operating data to obtain an operating result data, performs operation on the operating result data with the second encrypting key to obtain an operating response data, sends an operating response including response data to the client.

In Embodiment 1, before Step 101, the method further includes:

Step a1, the client sends a request for budding pairing key to the server;

Step a2, the server generates a client key pair, sends an extension register command to the authenticator via the client; the extension register command including a client version number and a client public key of the client key pair;

Step a3, the authenticator obtains the client version public key and the client version number in the extension register command, generates an authenticator key pair, generates a second parameter according to the client public key and an authenticator private key of the authenticator key pair;

Step a4, the authenticator obtains a first preset data stored in the authenticator, generates a second initial pairing key according to the client public key, the authenticator public key of the authenticator key pair, the client version number, the first preset data and the second parameter, splits the second initial pairing key to obtain a third key and a fourth key, stores the third key and the fourth key correspondingly;

Step a5, the authenticator sends an extension register response to the server via the client, the extension register response including authenticator public key and the client version number;

Step a6, the server obtains the authenticator public key and the client version number in the extension register response, generates a first parameter according to a client private key of the client key pair and the authenticator public key;

Step a7, the server obtains a first preset data stored by the server, generates a first initial pair key according to the client public key, the authenticator public key, the client version number, the first preset data and the first parameter, splits the first initial pair key to obtain a first key and a second key, stores the first key and the second key correspondingly.

Preferably, in Embodiment 1, before Step a1, the method further includes: a mobile terminal on which the client is builds Bluetooth connection with an authenticator.

Step a7 further includes: disconnecting Bluetooth connection.

In Embodiment 1, preferably, generating a first client identification and a first authenticator identification according to a first key specifically is: the server generates a first random number with preset length, obtains a stored first preset field and a stored second preset field, generates a first client identification according to the first random number, the first preset field and the first key and generates a first authenticator identification according to the first client identification, the second preset field and the first key.

Preferably, in Embodiment 1, generating a first client identification according to the first random number, the first preset field and the first key specifically is: the server concatenates the first preset field and the first random number orderly, performs operation on the first preset field and the first random number with the first key according to a fourth preset algorithm to obtain a first data, concatenates the first random number and the first data to obtain a first client identification.

Preferably, in Embodiment 1, generating a first authenticator identification according to the first client identification, the second preset field and the first key specifically is: the server concatenates the first client identification and the second preset field, performs operation on the first client identification and the second preset filed with the first key according to the fourth preset algorithm to obtain a third data, takes a preset byte of the third data as a first authenticator identification.

Preferably, in Embodiment 1, generating a first session key according to the second key specifically is: the server obtains a first preset data stored by the server, performs operation on the first random number and the first preset data with the second key according to the third preset algorithm to obtain a first session key.

Preferably, in Embodiment 1, verifying the first client identification according to the third key specifically is: the authenticator obtains a first preset field stored by the authenticator, the first random number and the first data in the first client identification, performs operation on the first preset field and the first random number with the third key according to the fourth preset algorithm to obtain a second data, determines whether the second data and the first data are identical, if yes, verifying is successful, otherwise, verifying is failed.

Preferably, in Embodiment 1, the authenticator generates a second authenticator identification according to the third key specifically is: the authenticator obtains a second preset field stored by the authenticator, concatenates the first client identification and the second preset field orderly, performs operation on the first client identification and the second preset field with the third key according to the fourth preset algorithm to obtain a fourth data, takes a preset byte of the fourth data as a second authenticator identification.

Preferably, in Embodiment 1, generating a second session key according to the fourth key specifically is: the authenticator obtains a first preset data stored by the authenticator, performs operation on the first random number and the first preset data with the fourth key according to the third preset algorithm to obtain a session key.

Preferably, in Embodiment 1, verifying the second authenticator identification specifically is: the client compares the second authenticator identification and the first authenticator identification, if they are identical, verifying is successful, otherwise, verifying is failed.

Preferably, in Embodiment 1, the client performs operation with the first session key to obtain a first handshake key specifically is: the client obtains a second random number and a second preset data stored by the client, performs operation on the second random number and the second preset data with the first session key according to the third preset algorithm to obtain a first handshake key.

Preferably, in Embodiment 1, the authenticator performs operation with the second session key to obtain a second handshake key specifically is: the authenticator obtains a fourth random number and a second preset data stored by the authenticator, perforins operation on the fourth random number and the second preset data with the second session key according to a third preset algorithm.

Preferably, in Embodiment 1, in Step 105, notifying that the first client identification is verified successful, stopping scanning and broadcasting broadcast data including the second authenticator identification specifically includes: the authenticator builds Bluetooth connection with the client, when the Bluetooth connection is disconnected, the authenticator broadcasts broadcast data including the second authenticator identification.

Preferably, in Embodiment 1, after the authenticator builds Bluetooth connection with the client, the method further includes: the authenticator sends a first unique identification address to the client, receives a second unique identification address sent from the client.

In this case, the broadcast data further includes the first unique identification address and the second unique identification address.

Specifically, Step 106 specifically includes: the client stops broadcasting, starts scanning the broadcast data including the first unique identification address and the second unique identification address, parses the broadcast data obtained by scanning to obtain a second authenticator identification, verifies the second authenticator identification, if verifying is successful, build Bluetooth connection with the authenticator, execute Step 107, otherwise, verifying is failed, procedure is end.

Preferably, in Embodiment 1, in Step 105, notifying that the first client identification is verified successfully specifically includes: the authenticator prompts a user to switch the state of the client from broadcast sate to scanning state via a prompting module.

Embodiment 2

According to Embodiment 2 of the present invention, a method for communicating between a server and an authenticator is provided. The method is adapted to a system including a client, an authenticator and a server, the client is an application installed on a mobile terminal with Bluetooth function. The method specifically includes a session discovering phase, a handshake phase and a communication encrypting phase.

Figure 2:
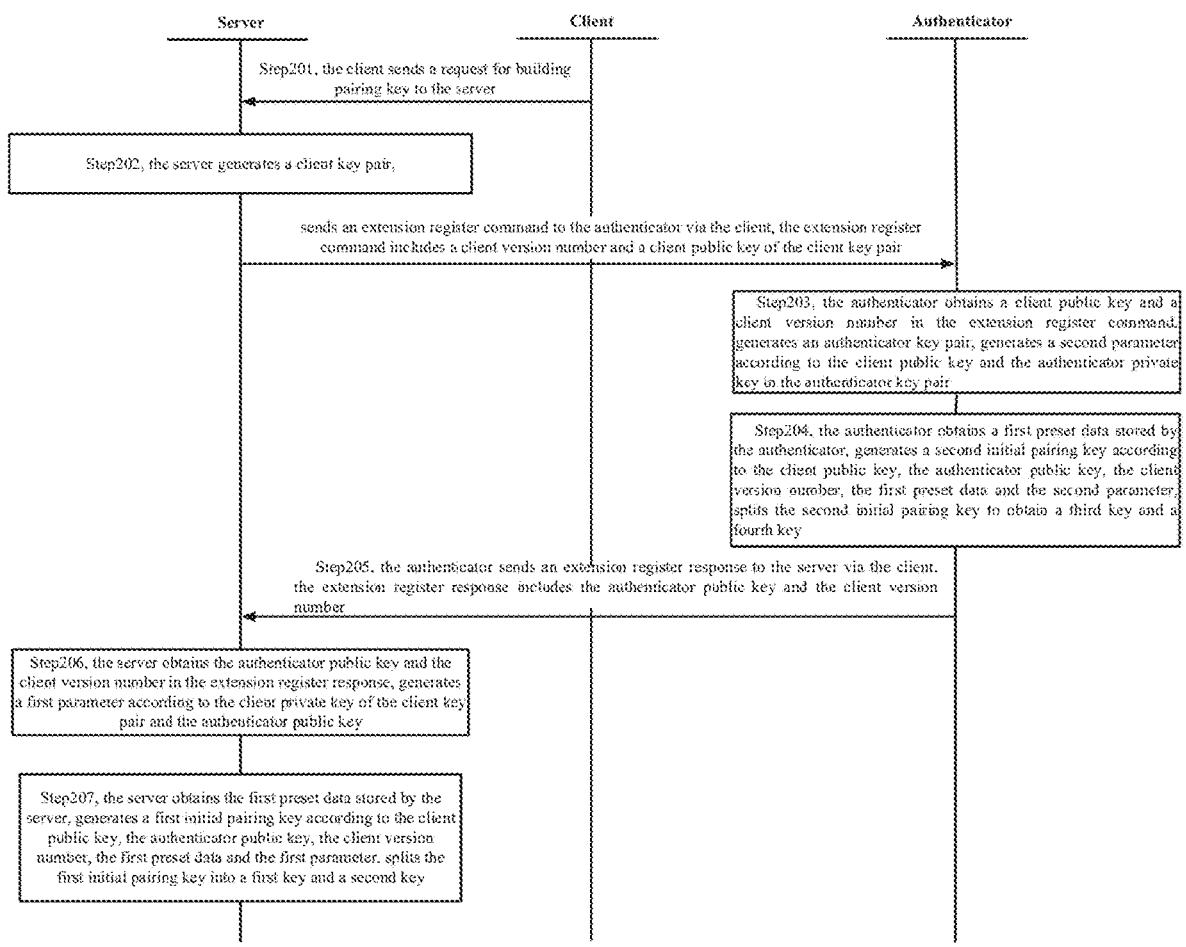
FIG. 2 is a flow chart of a method for building pairing key in a session phase of the method for communicating provided by Embodiment 2 of the present invention.

Embodiment 2 is a specific process that a server communicates with an authenticator for the first time. In this case; the session phase includes three phases: pairing key building, session data building and session discovering;

In this case, as shown in FIG. 2, a process for building a pairing key in the session phase includes the following step.

Step 201 the client sends a request for building pairing key to the server.

Step 202 the server generates a client key pair, sends an extension register command to the authenticator via the client, the extension register command includes a client version number and a client public key of the client key pair.

In Embodiment 2, the server generates a client key pair specifically is: the server generates a client key pair according to a preset algorithm.

In this case, the client key pair generated by the server includes: a client public key and a client private key;
  the first preset algorithm specifically is an algorithm for generating key pair.
For example, the first preset algorithm is: ECC-256;
  5F164D70138A35F67FAAEF38E7D4A8C9249A6C8
    830A4A46C9844B617E9AD15AD3E2BC019CB3-
    984A24AB217303309615FBD58542739957227-
    510060CA9 7F1A2E7;
  the client public key generated by the server is:
  5F164D70138A35F67FAAEF38E7D4A8C9249A6C88-
    30A4A46C9844B617E9 AD15AD3E2BC019CB398-
    4A24AB- 217303309615FBD5854273995722751006-
    00CA9 7F1A2E7;
  the client private key generated by the server is:
  B3CE8A2AAD3E110A5E170D2DA0F3F098EE707-
    0041100976385AB0FB4C 95F8CE7;

the extension register command sent to the authenticator specifically is:

```
dictionary CableRegistrationData {
required sequence<long> versions; required BufferSource rpPublicKey;
}; and
the client version number is: "00000001".
```

In Embodiment 2, before Step 201, the method further includes: the mobile device on which the client is builds Bluetooth connection with the authenticator; before building Bluetooth connection, the method further includes: the authenticator powers up and begins broadcasting.

Preferably, the mobile terminal on which the client is builds Bluetooth connection with the authenticator specifically is: the authenticator broadcasts Bluetooth data, the mobile terminal on which the client is scans Bluetooth device, when the mobile terminal determines that the Bluetooth device required to be connected is the authenticator, the mobile terminal performs Bluetooth connection with the authenticator.

Preferably, the mobile device on which the client is and the authenticator belong to Bluetooth device. If the data broadcasted by the authenticator claims that no access permission is required, the mobile device on which the client is can directly send a data to perform communicating.

The data broadcasted by the authenticator claims that no access permission is required, which means that the way for communicating is open mode.

In the present embodiment 2, the extension register command sent from the server to the authenticator via the client is data conformed to standard Bluetooth protocol; specifically, the extension register command is sent via Bluetooth transmission layer which is built between the mobile terminal on which the client is and the authenticator.

Step 203, the authenticator obtains a client public key and a client version number in the extension register command, generates an authenticator key pair, generates a second parameter according to the client public key and the authenticator private key in the authenticator key pair.

In Embodiment 2, that the authenticator generates an authenticator pair specifically includes: the authenticator generates an authenticator key pair according to a first preset algorithm; the authenticator key pair includes an authenticator private key and an authenticator public key;

In this case, the first preset algorithm is algorithm for generating key pair, the authenticator and the client use a same algorithm to generate key pair.

For example, the first preset algorithm is: ECC-256;
the authenticator pubic key is:
CCF146DD3FF87173845A576973664EB2BB8086-
1CA10A656ADC526B4075FA06EE52B4A7C65-
B12CA572441D2354B08E8172BC296925ADEF8E-
898BCD5FA 1189467B;
the authenticator private key is:
4C5CD1D426794EB72CBE05D8339799E48161D7F-
BFDE4D6B2FFB76A96 62C5CFC5.

In this case, generating a second parameter according to the client public key and the authenticator private key of the authenticator key pair specifically is: generating a second parameter according to the client public key and the authenticator private key of the authenticator key pair and a second preset algorithm.

Specifically, the second preset algorithm is ECDH algorithm.

Further, generating a second parameter according to the client public key and the authenticator private key of the authenticator key pair and a second preset algorithm specifically is: the authenticator performs multiply operation on the authenticator private key and the client public key to obtain a product, takes the first 32 bytes of the product as a second parameter.

For example, the authenticator performs multiply operation on the authenticator private key and the client public key to obtain a product, i.e. 8BD9B24EE678
018E10060487A55FF3774765F8A132AF43BD0101F03E
172181D1718086A26245A9808CA09E3048497939D1F-
314825660DCB14DBEF1F 0F6EE619B9;
the second parameter is:
8BD9324EE678018E10060487A55FF3774765F8AB2-
AF433DD101F03E17 2181D17.

Step 204, the authenticator obtains a first preset data stored by the authenticator, generates a second initial pairing key according to the client public key, the authenticator public key, the client version number, the first preset data and the second parameter, splits the second initial pairing key to obtain a third key and a fourth key.

In Embodiment 2, the authenticator generates a second initial pairing key according to the client public key, the authenticator public key, the client version number, the first preset data and the second parameter specifically is: the authenticator generates a second initial pairing key according to the client public key, the authenticator public key, the client version number, the first preset data, the second parameter and a third preset algorithm.

The authenticator generates a second initial pairing key according to the client public key, the authenticator public key, the client version number, the first preset data, the second parameter and a third preset algorithm specifically is: the authenticator concatenates the client version number, the client public key and the authenticator public key orderly and perform hash operation on concatenated result to obtain a salt value, performs operation on the salt value and the first preset data according to a third preset algorithm by taking the second parameter as key to obtain a second initial pairing key.

In Embodiment 2, the length of the obtained second initial pairing key is 32 bytes, the first 16 bytes is the third key, the last 16 bytes is the fourth key.

In Embodiment 2, the method further includes: the authenticator stores the third key and the fourth key correspondingly in a second initial pairing key list.

For example, the first preset data is ASCII character string, i.e. "FIDO caBLE v1 pairing data";
the third preset algorithm is: (HKDF-SHA-256);
the authenticator concatenates the client version number, the client public key and the authenticator key orderly to obtain:
000000015F164 D70138A35F67 FAAE F38E7D4A8
C92- 49A6C8830A4A46C98 44B617E9AD15AD3E
2BC019CB3984A24AB217303309615FBD5854273-
99572275100600A97F1A2E700F1460D3FF8717-
384- 5A576973664EB2BB808610A10A656ADC5-
26B4075FA06EE52B4A7C65B12CA572441D2354-
B08E8172BC296925ADEF8 E898BCD5FA1 1 894
67B;
the authenticator performs operation on the salt value and the first preset data according to a third preset algorithm by taking the second parameter as key to obtain a second initial pairing key, i.e.
8BD9B24EE678018E1C060487A55FF3774765F8A-
B2AF43BDD101F03E17 2181D17;

the authenticator splits the second initial pairing key to obtain the third key, i.e. 039A77D140D5077E90EA705B344E10B35A50433540E55792A2064BE31571E8 83, and the fourth key, i.e. B66209F7436B16AD30A177970A266E89A3964B4DEF09FB9A15665CC1C6C310 87.

Step 205 the authenticator sends an extension register response to the server via the client, the extension register response includes the authenticator public key and the client version number.

In Embodiment 2, sending an extension register response to the server specifically is executed as the following:

```
CableRegistration = {
version: int,
maxVersion: int,
authenticatorPublicKey: bytes,
}.
```

Step 206, the server obtains the authenticator public key and the client version number in the extension register response, generates a first parameter according to the client private key of the client key pair and the authenticator public key.

In Embodiment 2, generating a first parameter according to the client private key of the client key pair and the authenticator public key specifically is: generating a first parameter according to the client private key of the client key pair, the authenticator public key and the second preset algorithm.

Specifically, generating a first parameter according to the client private key of the client key pair, the authenticator public key and the second preset algorithm specifically is: the server performs multiply operation on the client private key and the authenticator public key to obtain a product, takes the first 32 bytes of the product as a first parameter.

In this case, the second preset algorithm is ECDH algorithm.

For example, the server performs multiply operation on the client private key and the authenticator public key to obtain a product, i.e.
8BD9B24EE678018E1CC6C487A55FF3774765F8AB2AF43BDD101F03E172181D1718D86A26245A9808CA09E3048497939D1F314825660DCB14DBEF1F0F6EE619B9;
the first parameter is:
8BD9B24EE678018E1CC6C487A55FF3774765F8AB2AF43BDD101F03E17 2181D17.

Step 207, the server obtains the first preset data stored by the server, generates a first initial pairing key according to the client public key, the authenticator public key, the client version number, the first preset data and the first parameter, splits the first initial pairing key into a first key and a second key.

In Embodiment 2, generating a first initial pairing key according to the client public key, the authenticator public key, the client version number, the first preset data and the first parameter specifically is: generating a first initial pairing key according to the client public key, the authenticator public key, the client version number, the first preset data, the first parameter and the third preset algorithm.

Specifically, the server generates a first initial pairing key according to the client public key, the authenticator public key, the client version number, the first preset data, the first parameter and the third preset algorithm specifically is: the server concatenates the client version number, the client version number and the authenticator public key orderly and performs hash operation on concatenated result to obtain a salt value, performs operation on the salt value and the first preset data according to the third preset algorithm by taking the first parameter as the key.

In Embodiment 2, the server stores the first key and the second key correspondingly in the first initial pairing key list.

In this case, the length of a first initial pairing key is 32 bytes, the first 16 bytes is the first key, the last 16 bytes is the last key.

For example, the first preset data is ASCII character string, i.e. "FIDO caBLE v1 pairing data";
the third preset algorithm is: (HKDF-SHA-256):
the first initial pairing key is:
8BD9B24EE678018E1CC6C487A55FF3774765F8AB2AF43BDD101F03E17 2181D17;
the server concatenates the version number, the client public key and the authenticator key orderly to obtain:
000000015F164D70138A35F67FAAEF38E7D4A8C9249A6C8830A4A46C98 44B617E9AD15AD3E2BC019CB3984A24AB2173033C9615FBD585427399572275 10060CA97F1A2E7CCF146DD3FF87173845A576973664EB2BB80861CA10A656ADC526B4075FA06EE52B4A7C65B12CA572441D2354B08E8172BC296925ADEF8 E898BCD5FA1189-467B;
the first initial pairing key is:
8BD9B24EE678018E1CC6C487A55FF3774765F8A-B2AF43BDD101F03E17 2181D17;
the first key is:
039A77D14CD5077E9DEA7C5B344E1CB35A50433-540E55792A2D64BE31 571E883;
the second key is:
B66209F7436B16AD3CA177970A266E89A3964B4-DEFC9FB9A15665CC1C 6C31087.

Figure 3:
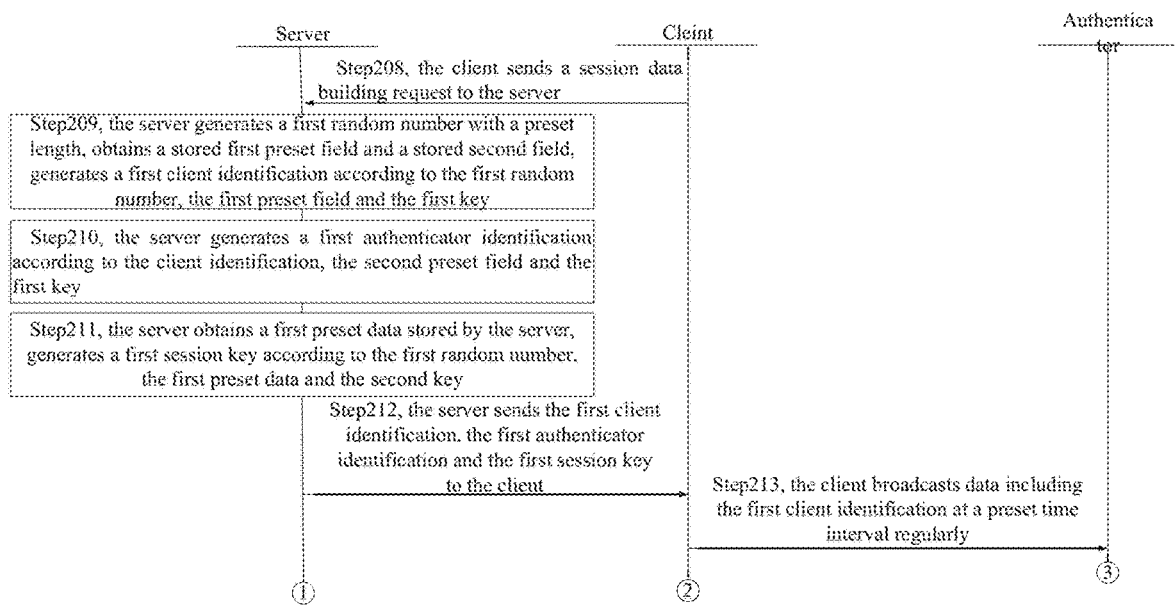
FIG. 3 is a flow chart of a method for building session data and session discovering in the session phase of the method for communicating provided by Embodiment 2 of the present invention.
Figure 3:
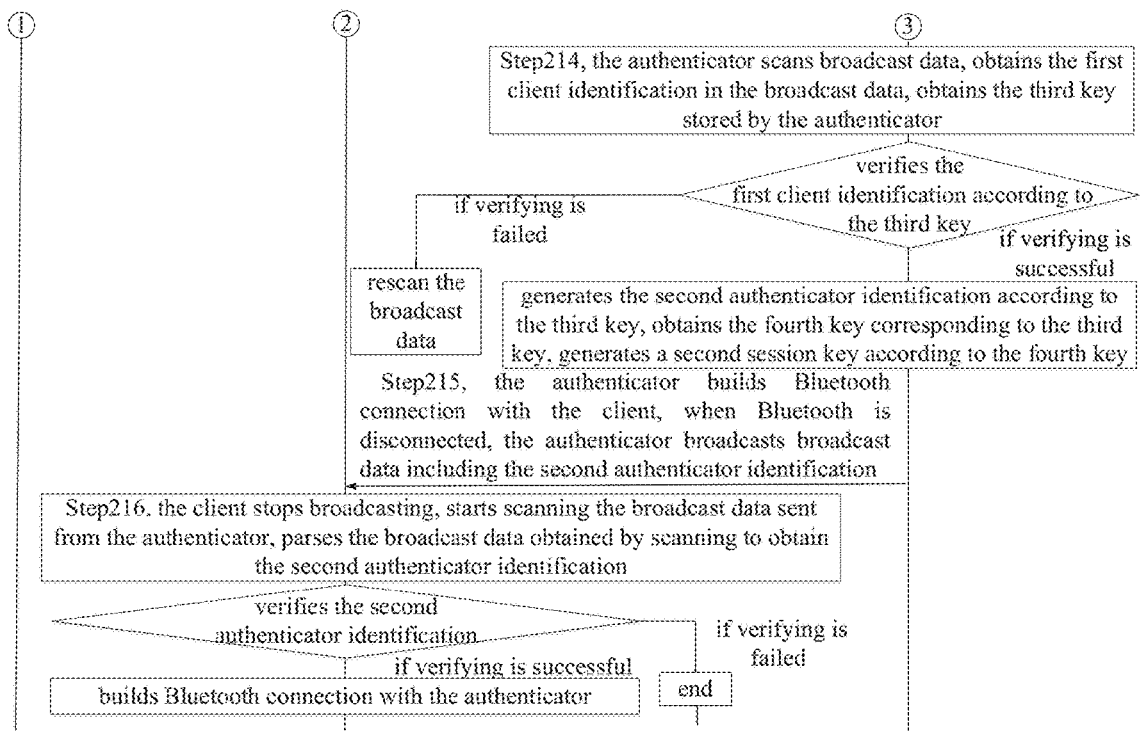

Specifically, as shown in FIG. 3, the session data building and session discovering process in the session phase includes the following steps.

Step 208, the client sends a session data building request to the server.

Step 209, the server generates a first random number with a preset length, obtains a stored first preset field and a stored second field, generates a first client identification according to the first random number, the first preset field and the first key.

In Embodiment 2, generating a first client identification according to the first random number, the first preset field and the first key specifically is: the server concatenates the first preset field and the first random number orderly, performs operation on the first preset field and the first random number according to a fourth preset algorithm via the first key to obtain a first data, concatenates the first random number and the first data to obtain a first client identification.

In this case, the preset length of the first random number generated by the server is 8 bytes.

For example, the first random number is: EB59387103AF03A5,
the first preset field is: "client";
the second preset field is: "authenticator";
the fourth preset algorithm specifically is: (HMAC-SHA256);
the first data obtained by performing operation is 8 bytes;
the first data obtained by performing operation on the first preset field and the first random number via the first key according to the fourth preset algorithm is:
46D62B1364719F61;
the first client identification clientEid obtained by concatenating the first random number and the first data is:
EB59387103AF03A546D62B1364719F61.

Step 210, the server generates a first authenticator identification according to the client identification, the second preset field and the first key.

In Embodiment 2, Step 210 specifically is: the server concatenates the first client identification and the second preset field orderly, performs operation on the first client identification and the second preset field via the first key according to the fourth preset algorithm to obtain a third data, takes the first 16 bytes of the third data as the first authenticator identification.

For example, the second preset field is: "authenticator"; the third data is: 4C7202F77750552-8DDF467D11BA1CC5F;

the first authenticator identification authenticatorEid is: 4C7202F777505528DDF467D11BA1CC5F.

Step 211, the server obtains a first preset data stored by the server, generates a first session key according to the first random number, the first preset data and the second key.

In Embodiment 2, generating a first session key according to the first random number, the first preset data and the second key specifically is: the server generates the first session key by performing operation on the first random number and the first preset data via the second key according to the third preset algorithm to obtain the first session key.

In this case, the third preset algorithm is: (HKDF-SHA-256);
the first preset data is ASCII character string, i.e. "FIDO caBLE v1 pairing data";
the first session key sessionPreKey is: E93BCD54F6726C30DE871348C44C0D85726796900-F8A2C035DF6CE7C11F4498E.

Step 212, the server sends the first client identification, the first authenticator identification and the first session key to the client.

Step 213, the client broadcasts data including the first client identification at a preset time interval regularly.

In Embodiment 2, the client broadcasts data according to preset broadcasting format, specifically, the first client identification is stored in data option of the broadcasted data, specifically, the data option is Service Data.

Step 214, the authenticator scans broadcast data, obtains the first client identification in the broadcast data, obtains the third key stored by the authenticator, verifies the first client identification according to the third key, if verifying is successful, generates the second authenticator identification according to the third key, obtains the fourth key corresponding to the third key, generates a second session key according to the fourth key, execute Step 215, if verifying is failed, rescan the broadcast data.

In Embodiment 2, after the authenticator sends the extension register response to the client, the method further includes: the authenticator activates scanning.

In Embodiment 2, verifying the first client identification according to the third key specifically is: the authenticator obtains the first preset field stored by the authenticator, the first random number and the first client identification which are in the first client identification, performs operation on the first preset field and the first random number via the third key according o the fourth preset algorithm to obtain the second data, determines whether the second data and the first data are identical, if yes, verifying is successful, otherwise, verifying is faded.

Specifically, verifying the first client identification according to the third key specifically is: the authenticator takes the first 8 bytes of the first client identification as the first random number and takes the last 8 bytes of the first client identification as the first data, performs operation on the first preset field and the first random data via the third key according to the fourth preset algorithm to obtain the second data, determines whether the second data and the first data are identical, if yes, verifying is successful, otherwise, verifying is failed.

Preferably, the authenticator generates a second authenticator identification according to the third key specifically is: the authenticator obtains a second preset field stored by the authenticator, concatenates the first client identification and the second preset field orderly, performs operation on the first client identification and the second preset field via the third key according to the fourth preset algorithm to obtain a fourth data, takes a preset byte of the fourth data as the authenticator identification.

In Embodiment 2, specifically, the preset byte is the first 16 bytes of the fourth data.

Preferably, generating a second session key according to the fourth key specifically is: the authenticator obtains the first preset data stored by the authenticator, performs operation on the first random number and the first preset data via the fourth key according to the third preset algorithm to obtain a second session key.

For example, the second authenticator authenticatorEid is: 4C7202F777505528DDF467D11BA1CC5F;
the second session key sessionPreKey is: E93BCD54F6726C30DE871348C44C0D8572679690-0F8A2C035DF6CE7C11F4498E.

Step 215, the authenticator builds Bluetooth connection with the client, when Bluetooth is disconnected, the authenticator broadcasts broadcast data including the second authenticator identification.

In Embodiment 2, the authenticator broadcasts broadcast data according to preset broadcast format, specifically, the second authenticator identification is stored in data option of the broadcast data, specifically the second authenticator identification is stored in Service Data option.

Preferably, the authenticator build Bluetooth connection with the client specifically is: the authenticator sends a Bluetooth connection establishing request to the client.

Further, after the authenticator builds Bluetooth connection with the client, the method further includes: the authenticator waits for receiving a response of disconnecting Bluetooth connection from the client.

Further, after the authenticator builds Bluetooth connection with the client, the method further includes: the authenticator sends a request of disconnecting Bluetooth connection to the client.

Preferably, in Embodiment 2, after the authenticator builds Bluetooth connection with the client, the method further includes: the authenticator sends a first unique identification address to the client, receives a second unique identification address sent from the client.

In this case, the broadcast data broadcasted by the authenticator includes the first unique identification address and the second unique identification address.

Step 216, the client stops broadcasting, starts scanning the broadcast data sent from the authenticator, parses the broadcast data obtained by scanning to obtain the second authenticator identification, verifies the second authenticator identification, if verifying is successful, builds Bluetooth connection with the authenticator, if verifying is failed, the procedure is end.

Specifically, Step 216 specifically includes: the client stops broadcasting, starts scanning the broadcast data including the first unique identification and the second unique identification, parses the broadcast data obtained by scanning to obtain the second authenticator identification, verifies the second authenticator identification, if verifying is successful, builds Bluetooth connection with the authenticator, if verifying is failed, the procedure is end.

In Embodiment 2, verifying the second authenticator identification specifically is: the client compares the second authenticator identification with the first authenticator identification, if they are identical, verifying is successful, otherwise, verifying is failed.

Figure 4:
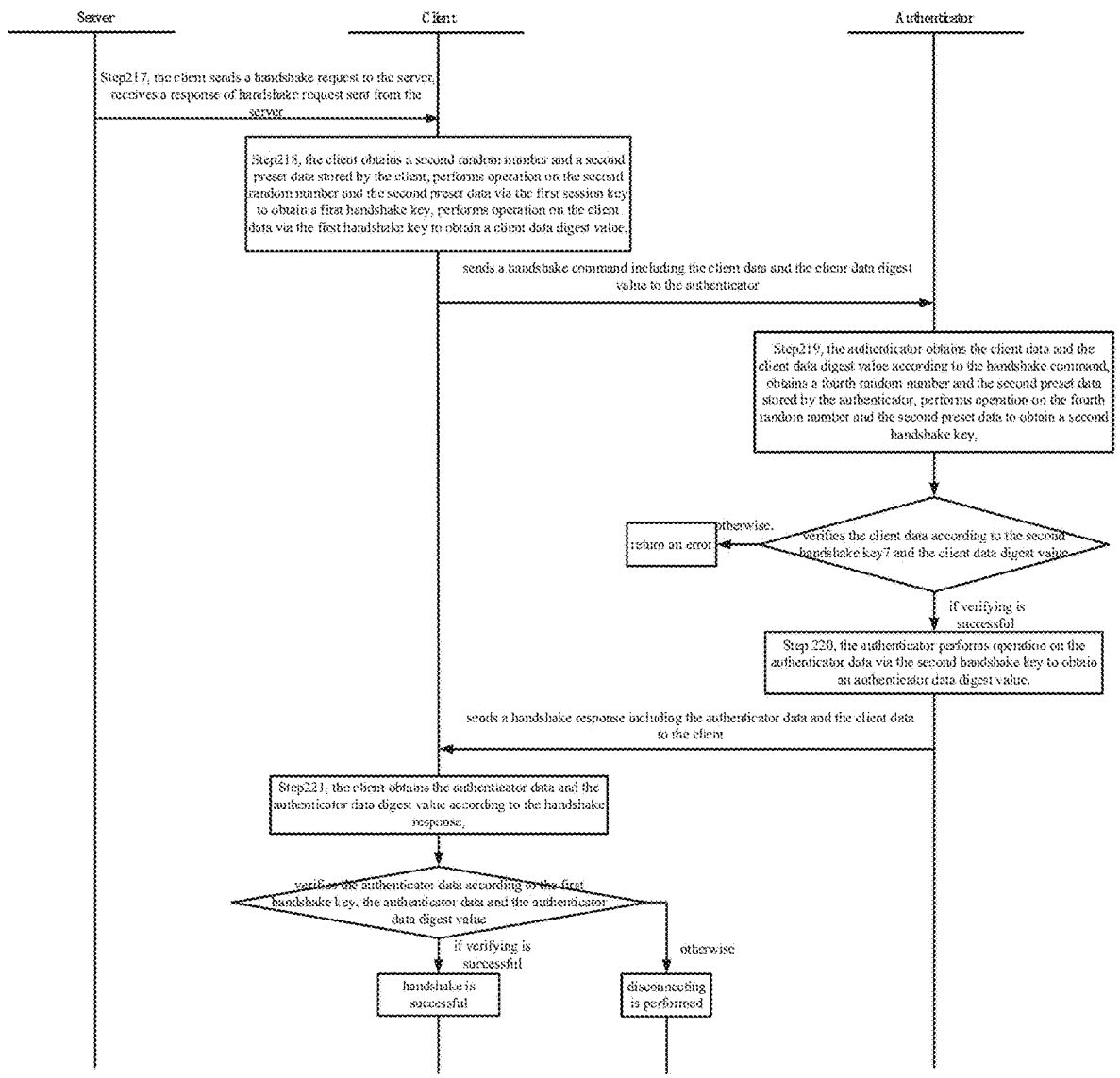
FIG. 4 is a flow chart of a method of a handshake phase of the method for communicating provided by Embodiment 2 of the present invention.

As shown in FIG. 4, the handshake phase includes the following steps.

Step 217, the client sends a handshake request to the server, receives a response of handshake request sent from the server.

Step 218, the client obtains a second random number and a second preset data stored by the client, performs operation on the second random number and the second preset data via the first session key to obtain a first handshake key, performs operation on the client data via the first handshake key to obtain a client data digest value, sends a handshake command including the client data and the client data digest value to the authenticator.

In Embodiment 2, preferably, the client obtains the second random number specifically is: the client takes the first random number of the session phase as the second random number.

The first random number specifically is a random number with 8 bytes generated by the client at the session phase.

In this case, the client performs operation on the second random number and the second preset data via the first session key to obtain a first handshake key specifically is: the client performs operation on the second random number and the second preset data via the first session key according to the third preset algorithm to obtain a first handshake key.

Performing operation on the client data via the first handshake key to obtain a client data digest value specifically is: the client generates a third random number, takes a preset field of the client and the third random number as client data, performs operation on the client data via the first handshake key according to the fourth preset algorithm to obtain a client data digest value, Specifically, the client data includes: the preset field of the client and the third random number of 16 bytes generated by the client.

For example, the second preset data is ASCII character string "FIDO caBLE v1 handshakeKey";
the obtained first handshake key is:
31454C6E1BB6A9D64790C9B1FD1372F85F5DC0-9072B398317FF0760EACE009A5;
the third random number is: A7F65B4E7E-13B17ACFFD14103B9B13C9,
the preset field of the client is:
6361424C457631636C69656E7468656C6C6F;
the client data is:
6361424C457631636C69656E7468656C6C6FA7F65-B4E7E13B17ACFFD14103B9B13C9;
the client digest value is:
A7F57B13C10EE624F3B40E3F7B073567.

Step 219, the authenticator obtains the client data and the client data digest value according to the handshake command, obtains a fourth random number and the second preset data stored by the authenticator, performs operation on the fourth random number and the second preset data to obtain a second handshake key, verifies the client data according to the second handshake key, the client data and the client data digest value, if verifying is successful, execute Step 220; otherwise, return an error.

In Embodiment 2, preferably, that the client obtains the fourth random number specifically is: the client takes the first random number of the session phase as the fourth random number.

In this case, the first random number specifically is an 8 bytes random number generated by the client during the session phase;

Preferably, that the client obtains a fourth random number specifically is: the client generates a fourth random number.

In this case, that the authenticator performs operation on the fourth random number and the second preset data via the second session key to obtain a second handshake key specifically is: the authenticator performs operation on the fourth random number and the second preset data via the second session key according to the third preset algorithm to obtain a second handshake key.

Specifically, verifying the client data according to the second handshake key, the client data and the client data digest value specifically is: the authenticator performs operation on the client data via the second handshake key according to the fourth preset algorithm to obtain the client data digest value, determines whether the client data digest value obtained by performing operation and the received client data digest value are identical, if yes, verifying is successful, otherwise, verifying is failed.

For example, the second preset data is ASCII character string "FIDO caBLE v1 handshakeKey";
the second handshake key is:
31454C6E1BB6A9D64790C9B1FD1372F85F5DC09-072B398317FF0760EACE009A5.

Step 220, the authenticator performs operation on the authenticator data via the second handshake key to obtain an authenticator data digest value, sends a handshake response including the authenticator data and the client data to the client.

In Embodiment 2, performing operation on the authenticator data via the second handshake key to obtain an authenticator data digest value specifically is: the authenticator generates a fifth random number, takes a preset field of authenticator and the fifth random number as authenticator data, performs operation on the authenticator data via the second handshake key according to the fourth preset algorithm to obtain an authenticator data digest value.

Specifically, the authenticator data includes: the preset field of authenticator and the fifth random number with 16 bytes generated by the authenticator.

For example the fifth random number is:
935337A931634E9C22C8EEB080827DF3;
the preset field of authenticator is:
6361424C45763161757468656E74696361746F726865-6C6C6F;
the authenticator data is:
6361424C45763161757468656E74696361746F72686-56C6C6F935337A931634E9C22C8EEB080827DF3;
the authenticator data digest value is:
07808B071C8E69DF1F1BFD13D52F39B8.

Step 221, the client obtains the authenticator data and the authenticator data digest value according to the handshake response, verifies the authenticator data according to the first handshake key, the authenticator data and the authenticator data digest value, if verifying is successful, handshake is successful; otherwise, disconnecting is performed.

Specifically, verifying the authenticator data via the first handshake key and the authenticator data digest value specifically is: the client performs operation on the authenticator data via the first handshake key according to the fourth preset algorithm to obtain an authenticator data digest value, determines whether the authenticator data digest value obtained by performing operation and the received authenticator data digest value are identical, if yes, verifying is successful, otherwise, verifying is failed.

Figure 5:
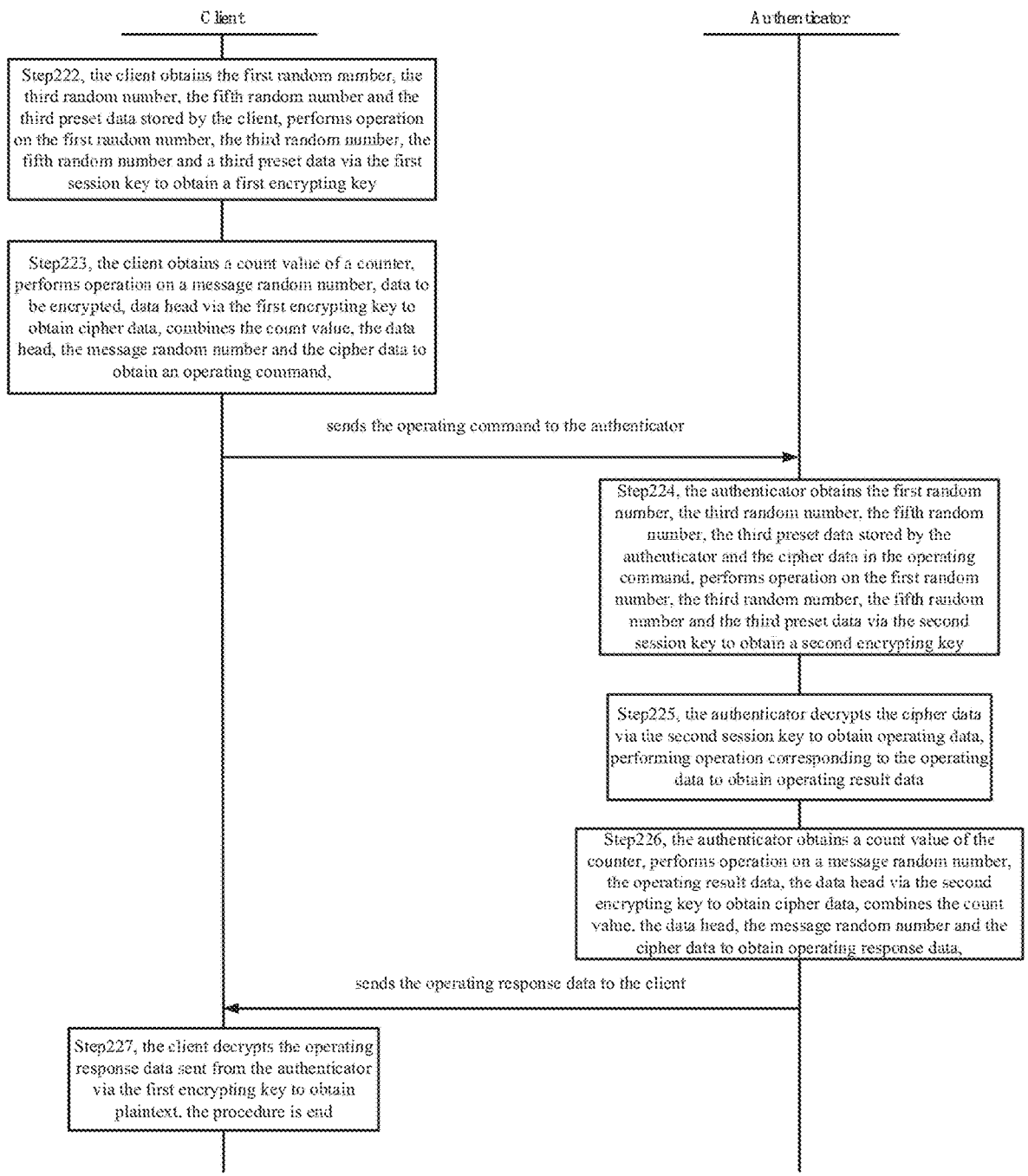
FIG. 5 is a flow chart of a method of data encrypting phase of the method for communicating provided by Embodiment 2 of the present invention.

As shown in FIG. 5, the data encrypting phase includes:

Step 222, the client obtains the first random number, the third random number, the fifth random number and the third preset data stored by the client, performs operation on the first random number, the third random number, the fifth random number and a third preset data via the first session key to obtain a first encrypting key.

In Embodiment 2, performing operation on the first random number, the third random number, the fifth random number and the third preset data via the first session key to obtain a first encrypting key specifically is: the client performs hash operation on the first random number, the third random number, the fifth random number to obtain a hash value, performs operation on the hash value obtained by performing hash operation and the third preset data via the first session key to obtain the first encrypting key.

Specifically, performing operation on the hash value and the third preset data via the first session key to obtain a first encrypting key specifically is: the client performs hash operation on the hash value obtained by performing operation and the third preset data via the first session key according to the third preset algorithm to obtain a first encrypting key.

For example, the first random number specifically is a random number generated by the client at the session phase;

the third random number specifically is a random number obtained by client at the handshake phase;

the fifth random number specifically is a random number obtained by the authenticator at the handshake phase;

the third preset data is ASCII character string "FIDO caBLE v1 sessionKey";

the first encrypting key is: 6D0D20CDFB8A55613AF009D804262CC673A78E1-E4293D1E1BF83BC7A54867ECC.

Step 223, the client obtains a count value of a counter, performs operation on a message random number, data to be encrypted, data head via the first encrypting key to obtain cipher data, combines the count value, the data head, the message random number and the cipher data to obtain an operating command, sends the operating command to the authenticator.

In Embodiment 2; the client performs operation on the message random number, data to be encrypted, data head via the first encrypting key to obtain cipher data specifically is: the client performs operation on the message random number, data to be encrypted, data head via the first encrypting key according to a fifth preset algorithm to obtain cipher data.

Specifically, the message random number specifically is: a combination of random number, the count value and a preset field, i.e., counter, at the session discovering phase.

The data head specifically is header, if sender is the client, the data head header specifically is *cmd* if the sender is the authenticator, the data head header specifically is *STAT* ; in this case, *STAT* specifically is *STAT* byte in *FIDO BLE* transmission protocol.

The fifth preset algorithm specifically is: AES256-GCM.

In this case, the counter specifically is 24 digit message counter; both of the counter at chant and the counter at authenticator are initialized to be zero, the count value of the counter is increased by degrees when message is sent every time, For example, the count value is: 0×00 (the client) 或者 0×01 (the authenticator);

data head, i.e. header=cmd, or header=STAT;

the message random number i.e. messageNonce=nonce (8 bytes)||Sender (1 byte)||Counter (3 bytes);

the cipher data i.e. chiperDATA=AES256-GCM(key=sessionKey, nonce=messageNonce, plaintext=DATA', additionalData=Header, taglength=128);

if Plaintext=0808080808080808,
messageNonce=EB359387103AF03A500000001,
sessionKey=6D0D20CDFB8A55613AF009D804262C-C673A78E1E4293D1E1BF83BC7A54867ECC;

after performing operation, chiperdata=F5 47 0E 58 75 25 21 E1 74 63 CA 62 24 3E 2E E0 is obtained.

Combining the count value, the data head, the message random number and the cipher data to obtain the operating command which specifically is 0×01+cmd+messagenonce+chiperdata.

Step 224, the authenticator obtains the first random number, the third random number, the fifth random number, the third preset data stored by the authenticator and the cipher data in the operating command, performs operation on the first random number, the third random number, the fifth random number and the third preset data via the second session key to obtain a second encrypting key.

In Embodiment 2, performing operation on the first random number, the third random number, the fifth random number and the third preset data via the second session key to obtain a second encrypting key specifically is: the authenticator performs hash operation on the first random number, the third random number and the fifth random number to obtain a hash value, performs operation on the hash value obtained by performing operation and the third preset data via the second session key to obtain a second encrypting key.

Specifically, performing operation on the hash value obtained by performing operation and the third preset data via the second session key to obtain a second encrypting key specifically is: the authenticator performs operation on the hash value obtained by performing operation and the third preset data via the second session key according to the third preset algorithm to obtain a second encrypting key.

For example, the first random number specifically is a random number generated by the client at the session discovering phase;

the third random number specifically is a random number generated by the client at the handshake phase;

the fifth random number specifically is a random number generated by the authenticator at the handshake phase;

the third preset data is ASCII character string "FIDO caBLE v1 sessionKey";

the second encrypting key obtained by performing operation is:
6D0D20CDFB8A55613AF009D80422CC673A78E1E-4293D1E1BF83BC7A54867ECC.

Step 225, the authenticator decrypts the cipher data via the second session key to obtain operating data, performing operation corresponding to the operating data to obtain operating result data, execute Step 226.

Step 226, the authenticator obtains a count value of the counter, performs operation on a message random number, the operating result data, the data head via the second encrypting key to obtain cipher data, combines the count value, the data head, the message random number and the cipher data to obtain operating response data, sends the operating response data to the client.

In Embodiment 2, the authenticator performs operation on the message random number, the operating result data, the data head via the second encrypting key to obtain cipher data specifically is: the authenticator performs operation on the message random number, the operating result data, the data head via the second encrypting key according to the fifth preset algorithm to obtain cipher data.

Specifically, the message random number specifically is: combination of the first random number, the count value and the preset field counter;

the data head specifically is header, if the sender is the client, the data head header specifically is cmd, if the sender is the authenticator, the data head header specifically is STAT; in this case, STAT specifically is STAT byte in FIDO BLE transmission protocol;

the fifth preset algorithm specifically is: AES256-GCM.

In this case, the counter specifically is a 24 digit message counter, both of the counter at client and the counter at authenticator are initialized to be zero, the count value of the counter is increased by degrees when message is sent every time, For example, the count value is 0×00 (the client) or 0×01 (the authenticator);

the data head, i.e. header=cmd, or header=STAT;

the message random number, i.e. messageNonce=nonce (8 bytes)||Sender (1 byte)||Counter (3 bytes);

then cipher data, i.e. chiperDATA=AES256-GCM(key=sessionKey, nonce=messageNonce, plaintext=DATA', additionalData=Header, taglength=128);

if Plaintext=0808080808080808,
messageNonce=EB59387103AF03A501000001,
sessionKey=6D0D20CDFB8A55613AF009D804262C-C673A78E1E4293D1E1BF83BC7A54867ECC;

after performing operation, chiperdata=44 C6 F2 7E BC 14 9F 49 EE 88 29 DB 60 E4 70 D0 is obtained;

combining the count value, the data head, the message random number and the cipher data to obtain operating response data which specifically is 0×01+cmd+messagenonce+chiperdata.

Step 227, the client decrypts the operating response data sent from the authenticator via the first encrypting key to obtain plaintext, the procedure is end.

In Embodiment 2, if the authenticator cannot decrypt the cipher data sent from the client, disconnecting is performed, while if the client cannot decrypt the cipher data sent from the authenticator, disconnecting is performed as well.

Embodiment 3

According to Embodiment 3 of the present invention, another method for communicating between a server and an authenticator is provided. The method is adapted to a system including a client, an authenticator and a server. In this case, the client is an application installed on a mobile terminal with Bluetooth function. The method specifically includes a session phase, a handshake phase and a communicating encrypting phase.

Embodiment 3 is a detailed process of non-first time communicating between the server and the authenticator. The process includes a session data building phase and a session discovering phase.

Figure 6:
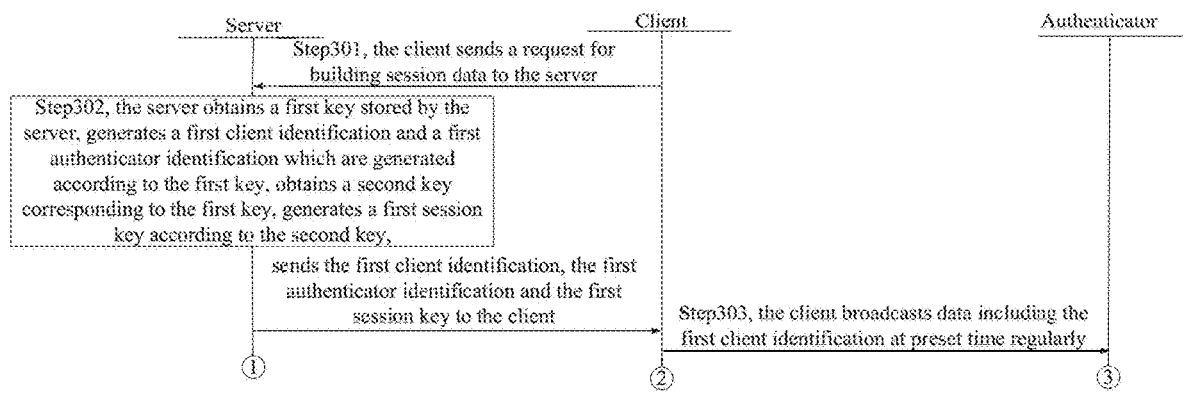
FIG. 6 is a flow chart of a method of session phase of the method for communicating provided by Embodiment 3 of the present invention.
Figure 6:
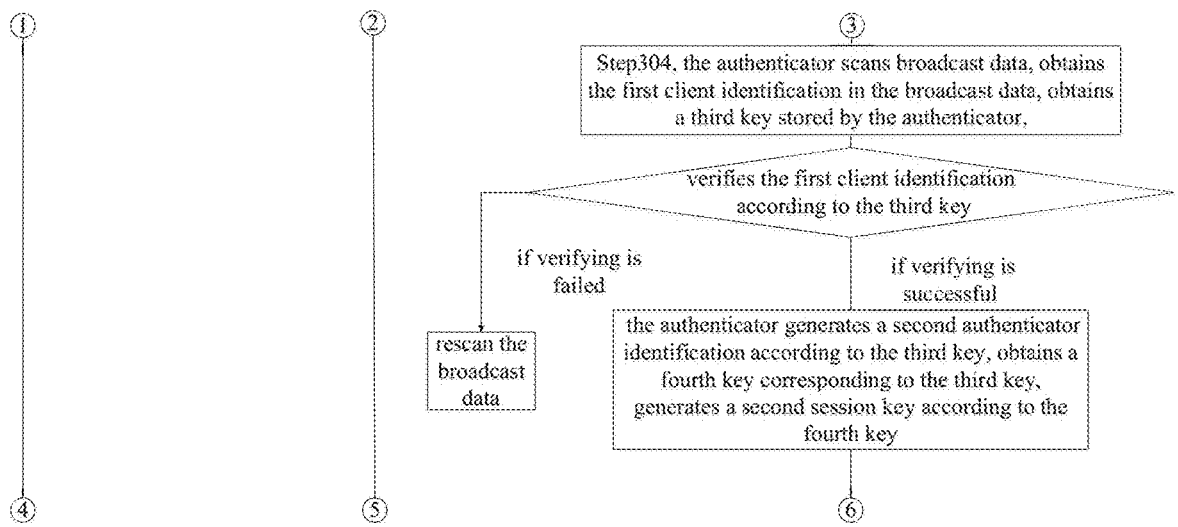
Figure 6:
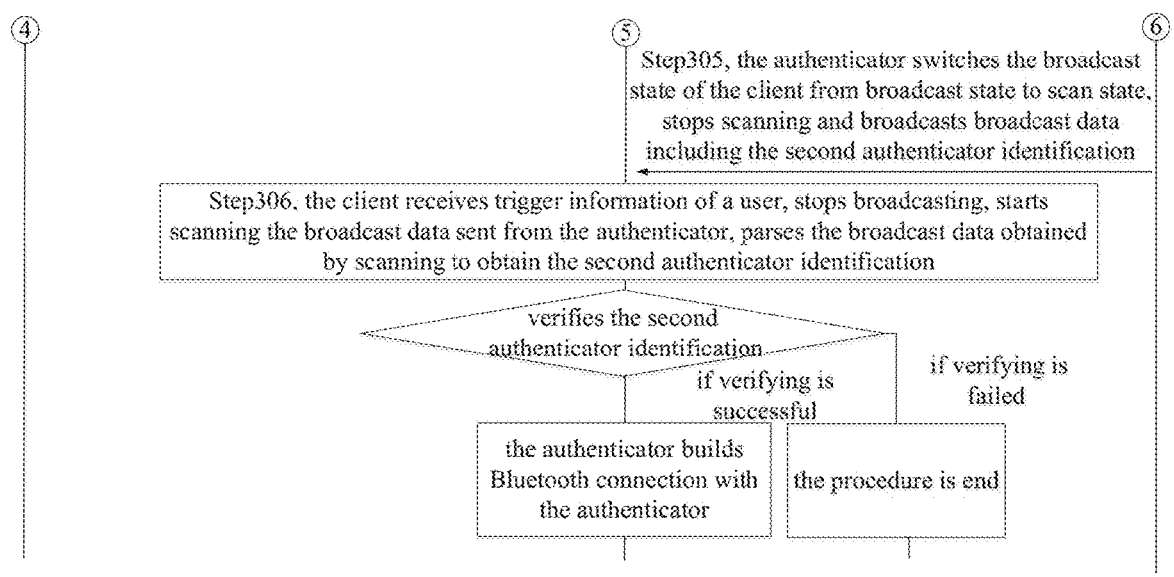

Specifically, as shown in FIG. 6, the session phase includes the following steps.

Step 301, the client sends a request for building session data to the server.

Step 302, the server obtains a first key stored by the server, generates a first client identification and a first authenticator identification which are generated according to the first key, obtains a second key corresponding to the first key, generates a first session key according to the second key, sends the first client identification, the first authenticator identification and the first session key to the client.

In Embodiment 3, Step 302 specifically includes:

Step M1, the server obtains an initial pairing key list stored by the server;

Step M2, the server obtains a first key in the initial pairing key list, generates a first client identification and a first authenticator identification according to the first key, obtains a second key corresponding to the first key, generates a first session key according to the second key;

Step M3, the server sends the first client identification, the first authenticator identification and the first session key to the client.

In Embodiment 3, generating a first client identification and a first authenticator identification according to the first key specifically includes: the server generates a first random number with preset length, obtains a first preset field and a second preset field which are stored by the server, generates a first client identification according to the first random number, the first preset field and the first key, generates a first authenticator identification according to the first client identification, the second preset field and the first key.

Preferably, the server generates a first client identification according to the first random number, the first preset field and the first key specifically includes: the server concatenates the first preset field and the random number orderly, performs operation on the first preset field and the first random number via the first key according to a fourth preset algorithm to obtain a first data, concatenates the first random number and the first data to obtain a first client identification.

In this case, the preset length of the first random number generated by the server is 8 bytes;

the first data obtained by performing operation includes 8 bytes;

the fourth preset algorithm specifically is: (HMAC-SHA256).

Preferably, generating a first authenticator identification according to the first client identification, the second preset field and the first key specifically is: the server concatenates the first client identification and the second preset field orderly, performs operation on the first client identification and the second preset field via the first key according to a fourth preset algorithm to obtain a second data, takes the first 16 bytes of the second data as the first authenticator identification.

In Embodiment 3, generating a first session key according the second key specifically includes: the server obtains a first preset data stored by the server, generates the first session key according to the first random number, the first preset data and the second key.

Preferably, the server generates the first session key according to the first random number, the first preset data and the second key specifically is: the server performs operation on the first random number and the first preset data via the second key according to a third preset algorithm to obtain the first session key.

In this case, the third preset algorithm is: (HKDF-SHA-256);

the first preset data is ASCII character string "FIDO caBLE v1 pairing data";

the first session key essionPreKey is:
E93BCD54F6726C30DE871348C44C0D85726796900-F8A2C035DF6CE7C11F4498E.

Step 303 the client broadcasts data including the first client identification at preset time regularly.

In Embodiment 3, the client broadcasts data according to preset broadcast format, specifically, the first client identification is stored in data option of broadcast data format, specifically the first client identification is stored in Service Data option.

Step 304, the authenticator scans broadcast data, obtains the first client identification in the broadcast data, obtains a third key stored by the authenticator, verifies the first client identification according to the third key, if verifying is successful, the authenticator generates a second authenticator identification according to the third key, obtains a fourth key corresponding to the third key, generates a second session key according to the fourth key, execute Step 305, if verifying is failed, rescan the broadcast data.

In Embodiment 3, Step 304 specifically includes: the authenticator scans broadcast data, obtains the first client identification in the broadcast data, obtains the third key in a second initial pairing key stored by the authenticator, verifies the first client identification according to the obtained third key, if verifying is successful, the authenticator generates a second authenticator identification according to the third key, obtains a fourth key corresponding to the third key, generates a second session key according to the fourth key, execute Step 305, if verifying is failed, the authenticator rescans the broadcast data.

In Embodiment 3, after the authenticator sends an extension register response, the method further includes: the authenticator activates scanning.

In Embodiment 3, verifying the first client identification according to the obtained third key specifically is: the authenticator obtains a first preset field stored by the authenticator, the first random number and the first data in the first client identification, performs operation on the first preset field and the first random number via the third key according to the fourth preset algorithm to obtain a second data, determines whether the second data and the first data are identical, if yes, verifying is successful, otherwise, verifying is failed.

Specifically, verifying the first client identification according to the obtained third key specifically is: the authenticator takes the first 8 bytes of the first client identification as the first random number and takes the last 8 bytes of the first client identification as the first data, performs operation on the first preset field and the first random number via the third key according to a fourth algorithm to obtain a second data, determines whether the second data and the first data are identical, if yes, verifying is successful; otherwise, verifying is failed.

Preferably, the authenticator generates a second authenticator identification according to the obtained third key according to which verifying is successful specifically is: the authenticator obtains a second preset field stored by the authenticator, concatenates the first client identification and the second preset field orderly, performs operation on the first client identification and the second preset field via the third key according to the fourth preset algorithm to obtain a fourth data, takes a preset byte of the fourth data as the authenticator identification.

In Embodiment 3, specifically, the preset byte is the first 16 bytes of the fourth data, Preferably, generating a second session key according to the fourth key specifically is: the authenticator obtains a first preset data stored by the authenticator, performs operation on the first random number and the first preset data via the fourth key according to the third preset algorithm to obtain a first session key.

Step 305, the authenticator switches the broadcast state of the client from broadcast state to scan state, stops scanning and broadcasts broadcast data including the second authenticator identification.

In Embodiment 3, the client broadcasts data according to preset broadcast format, specifically, the second client identification is stored in data option of broadcast data format, specifically the second client identification is stored in Service Data option.

Step 306, the client receives trigger information of a user, stops broadcasting, starts scanning the broadcast data sent from the authenticator, parses the broadcast data obtained by scanning to obtain the second authenticator identification, verifies the second authenticator identification, if verifying is successful, the authenticator builds Bluetooth connection with the authenticator, if verifying is failed, the procedure is end.

In Embodiment 3, verifying the second authenticator identification specifically is: the client determines whether the obtained second authenticator identification and the first authenticator identification corresponding to the broadcasted first client identification, if yes, verifying is successful, otherwise, verifying is failed.

In Embodiment 3, the handshake phase and the communication encrypting phase in the communicating process between the server and the authenticator are completed by the client; therefore, the handshake phase and the communication encrypting phase is the same as that of Embodiment 2, no more detail is given here.

Embodiment 4

Figure 7:
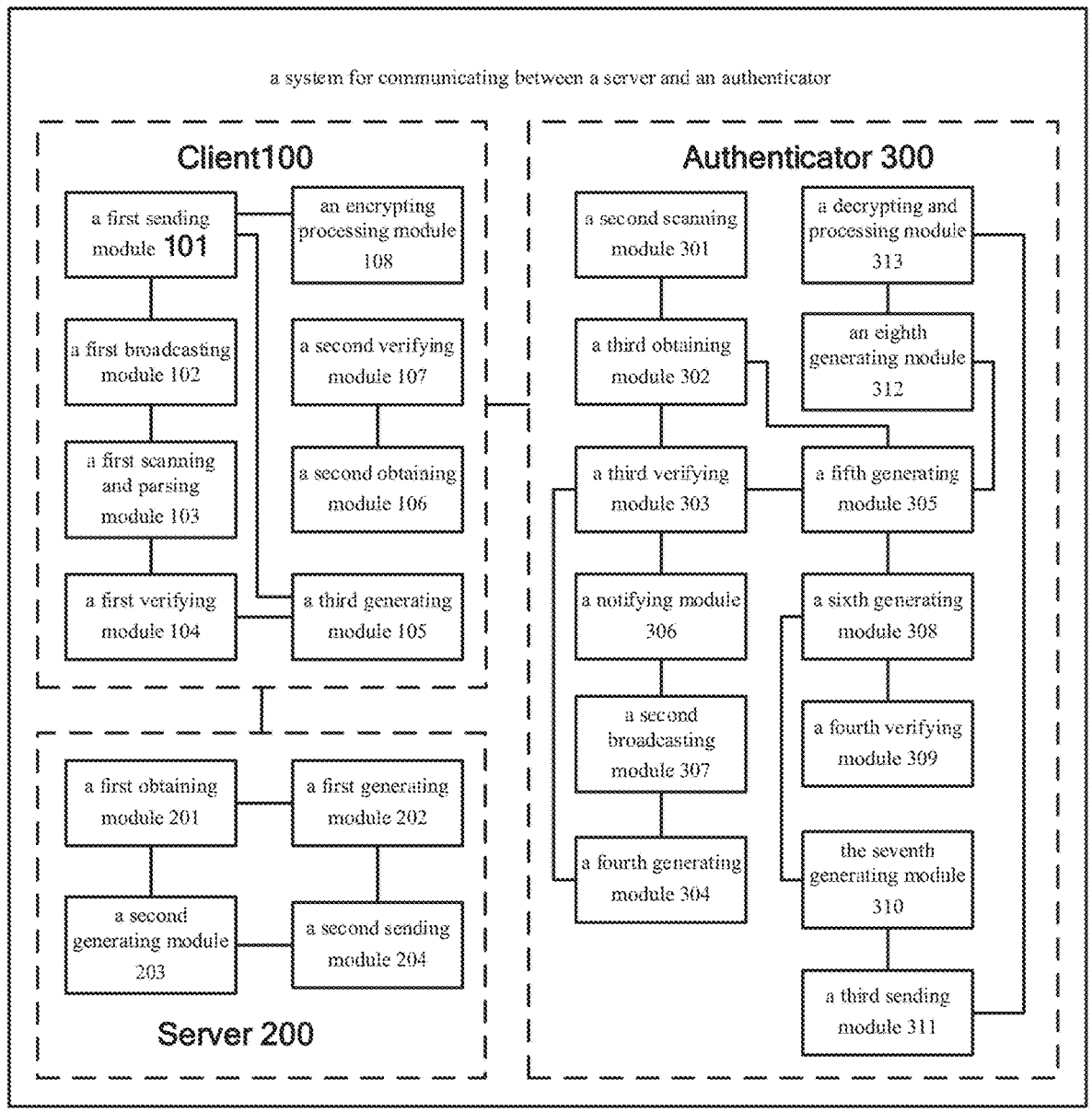
FIG. 7 is a block diagram of a system of communicating between a server and an authenticator provided by Embodiment 4 of the present invention.

According to Embodiment 4 of the present invention, a system for communicating between a server and an authenticator is provided. As shown in FIG. 7, the system includes: a client 100, a server 200 and an authenticator 300.

In this case, Client 100 includes:
a first sending module 101 configured to send a request for building session data to the server 200.

The server 200 includes:
a first obtaining module 201 configured to obtain a first key stored by itself;
a first generating module 202 configured to generate a first client identification and a first authenticator identification according to the first key;
the first obtaining module 201 further configured to obtain a second key corresponding to the first key;
a second generating module 203 configured to generate a first session key according to the second key;
a second sending module 204 configured to send the first client identification, the first authenticator identification and the first session key to the client 100.

The client 100 further includes:
a first broadcasting module 102 configured to broadcast data including the first client identification at a regular preset time period;
a first scanning and parsing module 103 configured to stop broadcasting, start scan broadcast data sent from the authenticator, parse the broadcast data obtained by scanning;
a first verifying module 104 configured to verify the second authenticator identification;
a third generating module 105 configured to obtain a first handshake key via the first session key, perform operation on client data via the first handshake key to obtain a client data digest value;

the first sending module 101 further configured to send a handshake command including the client data and the client data digest value to the authenticator 300;

a second obtaining module 106 configured to obtain the authenticator data and an authenticator data digest value according to a handshake response;

a second verifying module 107 configured to verify the authenticator data via the first handshake key, the authenticator data and the authenticator data digest value;

an encrypting processing module 108 configured to obtain a first encrypting key by performing operation via the first session key, perform operation on operating data via the first encrypting key to obtain cipher data;

the first sending module 101 further configured to send an operating command including the cipher data to the authenticator.

In this case, the authenticator 300 includes:

a second scanning module 301 configured to scan broadcast data, obtain the first client identification from the broadcast data;

a third obtaining module 302 configured to obtain a third key stored by itself;

a third verifying module 303 configured to verify the first client identification according to the third key;

a fourth generating module 304 configured to generate a second authenticator identification according to the third key;

a third obtaining module 302 further configured to obtain a fourth key corresponding to the third key;

a fifth generating module 305 configured to generate a second session key according to a fourth key;

a notifying module 306 configured to notify that verifying the first client identification is successful;

a second broadcasting module 307 configured to stop scanning and broadcast broadcast data including the second authenticator identification;

a third obtaining module 302 further configured to obtain the client data and the client data digest value according to the handshake command;

a sixth generating module 308 configured to obtain second handshake key via the second session key;

a fourth verifying module 309 configured to verify the client data according to the second handshake key, the client data and the client data digest value;

a seventh generating module 310 configured to perform operation on the authenticator data via the second handshake key to obtain the authenticator data digest value;

a third sending module 311 configured to send a handshake response including the authenticator data and the authenticator data digest value to the client 100;

the third obtaining module 302 configured to obtain cipher data in the operating command;

an eighth generating module 312 configured to perform operation via the second session key to obtain a second encrypting key;

a decrypting and processing module 313 configured to decrypt the cipher data via the second encrypting key to obtain operating data, perform operation corresponding to the operating data to obtain operating result data, performs operation on the operating result data via the second encrypting key to obtain operating response data;

the third sending module 311 further configured to send an operating response including operating response data to the client 100.

In Embodiment 4, preferably, the server 200 further includes:

a first generating and sending module configured to generate a client key pair, send an extension register command to the authenticator 300 via the client 100, the command includes a client version number and a client public key in the client key pair;

a first obtaining and generating module configured to obtain the authenticator public key and the client version number in an obtaining register response, generate a first parameter according to the client private key of the client key pair and the authenticator public key;

the first obtaining and generating module further configured to obtain a first preset data stored by itself, generate a first initial pair key according to the client public key, the authenticator public key, the client version number, the first preset data and the first parameter, split the first initial pair key to obtain the first key and the second key, store the first key and the second key correspondingly.

In this case, the authenticator 300 further includes:

a second obtaining and generating module configured to obtain a client public key and a client version number in the obtaining extension register command, generate an authenticator key pair, generate a second parameter according to the client public key and an authenticator private key of the authenticator key pair;

a second obtaining and generating module further configured to obtain a first preset data stored by itself, generate a second initial pair key according to the client public key, the authenticator public key of the authenticator key pair, the client version number, the first preset data and the second parameter, splits the second initial pair key to obtain a third key and a fourth key, store the third key and the fourth key correspondingly;

a third sending module 311 further configured to send an extension register response to the server 200 via the client 100, the extension register response includes the authenticator public key and the client version number.

In Embodiment 4, preferably, the first generating module 202 specifically includes a first generating and obtaining unit, a first generating unit and a second generating unit;

the first generating and obtaining unit configured to generate a first random number with a preset length, obtain a first preset field stored and a second preset field stored;

the first generating unit configured to generate a first client identification according to the first random number, the first preset field and the first key;

the second generating unit configured to generate the first authenticator identification according to the first client identification, the second preset field and the first key.

Preferably, the first generating unit is specifically configured to concatenate the first preset field and the first random number orderly, perform operation on the first preset field and the first random number to obtain a first data according to a fourth preset algorithm, concatenate the first random number and the first data to obtain the first client identification.

Preferably, the second generating unit is specifically configured to concatenate the first client identification and the second preset field orderly, perform operation on the first client identification and the second preset field via the first key according to the fourth preset algorithm to obtain a third data, take a preset byte of the third data as the first authenticator identification.

Preferably, the second generating module 203 specifically is configured to obtain a first preset data stored by itself, perform operation on the first random number and the first preset data via the second key according to a third preset algorithm to obtain a first session key.

In Embodiment 4, the third verifying module 303 specifically is configured to obtain a first preset field stored by itself, the first random number and the first data in the first client identification, perform operation on the first preset field and the first random number via the third key according to the fourth preset algorithm to obtain a second data, determine whether the second data and the first data are identical.

In Embodiment 4, preferably, the fourth generating module 304 specifically is configured to obtain a second preset field stored by itself, concatenate the first client identification and the second preset field orderly, perform operation on the first client identification and the second preset field via the third key according to a fourth algorithm to obtain a fourth data, take a preset byte of the fourth data as the second authenticator identification.

Preferably, the fifth generating module 305 specifically is configured to obtain a first preset data stored by itself, perform operation on the first random number and the first preset data via the fourth key according to the third preset algorithm to obtain a second session key.

In Embodiment 4, preferably, the first verifying module 104 specifically is configured to compare the second authenticator identification in the broadcast data with the first authenticator identification, if they are identical, verifying is successful, otherwise, verifying is failed.

In Embodiment 4, preferably, the third generating module 105 is configured to perform operation on the first session key to obtain a first handshake key; specifically, the third generating module is configured to obtain a second random number and a second preset data stored by itself, perform operation on the second random number and the second preset data via the first session key according to the third preset algorithm to obtain a first handshake key.

In Embodiment 4, preferably, the sixth generating module 308 specifically is configured to obtain a fourth random number and a second preset data stored by itself, perform operation on the fourth random number and the second preset data via the second session key according to the third preset algorithm to obtain the second session key.

In Embodiment 4, preferably, the notifying module 306 specifically is configured to build Bluetooth connection with the client 100; to trigger the second broadcasting module 307 when the Bluetooth connection is disconnected.

Preferably, the authenticator 300 further includes a sending and receiving module, the sending and receiving module is configured to send a first unique identification address to the client 100 and receive a second unique identification address sent from the client 100;

the data broadcasted by the second broadcasting module 307 further includes a first unique identification address and a second unique identification address;

the first scanning and parsing module 103 specifically is configured to stop broadcasting, start scanning the broadcast data including the first unique identification address and the second unique identification address and parse the broadcast data obtained by scanning;

the first verifying module 104 specifically is configured to verify the second authenticator identification, to build Bluetooth connection with the authenticator 300 if verifying is successful.

In Embodiment 4, preferably, the notifying module 306 specifically is configured to prompt the user to switch the broadcast state of Client 100 from broadcasting state to scanning state.

According to the present invention, based on Bluetooth connection between devices, the server generates session data via stored negotiated key and sends the session data to the client; the client and the authenticator build Bluetooth pairing connection at application level, perform bidirectional broadcast and scanning authentication in connecting process; an encrypting key is generated via the session key generated by the server after successful authentication and connection; data in communicating process is encrypted and transferred in communicating process via the encrypting key which is assures that data in transferring process will not be stolen, By adapting the method provided by the present invention, data security is improved in transferring process and benefit of user is assured.

A method and a system for communicating between a server and an authenticator provided by the present disclosure is introduced in detail above. The above description of the embodiments is merely to assist in understanding the method of the present disclosure and its core idea. At the same time, one of ordinary skill in the art might make various modifications on specific embodiments or its application scope according to the idea of the present disclosure. Thus, the content of the description above is not limit to the present disclosure.

The invention claimed is:

1. A method for making communication between a server and an authenticator, wherein the method is adapted to a system comprising a client, an authenticator and a server, and the method comprises the following steps:

S1) sending, by the client, a request for building session data to the server;

S2) obtaining, by the server, a first key corresponding to the client and being stored in the server, generating a first client identification and a first authenticator identification according to the first key, obtaining a second key corresponding to the first key, generating a first session key according to the second key, sending the first client identification, the first authenticator identification and the first session key to the client;

S3) broadcasting, by the client, data comprising the first client identification according to a preset time interval regularly;

S4) scanning, by the authenticator, broadcast data, obtaining the first client identification in the broadcast data, obtaining a third key stored in the authenticator, verifying the first client identification according to the third key, if verifying is successful, executing step S5, if verifying is failed, rescanning the broadcast data;

S5) generating, by the authenticator, a second authenticator identification according to the third key, obtaining a fourth key corresponding to the third key, generating a second session key according to the fourth key, notifying that verifying the first client identification is successful, and stopping scanning and broadcasting broadcast data comprising a second authenticator identification;

S6) stopping, by the client, broadcasting, starting to scan the broadcast data broadcasted by the authenticator, parsing the broadcast data obtained by scanning to obtain the second authenticator identification, verifying the second authenticator identification, if verifying is successful, building a Bluetooth connection with the authenticator, executing Step 107, while if verifying is failed, ending procedure;

S7) performing, by the client, computation with the first session key to obtain a first handshake key, performing computation on the client data with the first handshake key to obtain a client data digest value, and sending a handshake command comprising the client data and the client data digest value to the authenticator;

S8) obtaining, by the authenticator, the client data and the client data digest value according to the handshake command, performing computation with the second session key to obtain a second handshake key, verifying the client data according to the second handshake key, the client data and the client data digest value, if verifying is successful, performing computation on the authenticator data with the second handshake key to obtain the authenticator data digest value, and sending a handshake response comprising the authenticator data and the authenticator data digest value to the client;

S9) obtaining, by the client, the authenticator data and the authenticator data digest value according to the handshake response, verifying the authenticator data according to the first handshake key, the authenticator data and the authenticator data digest value, if verifying is successful, a handshake is successful, then executing step S10; otherwise, performing disconnecting;

S10) performing, by the client, computation with the first session key to obtain a first encrypting key, performing computation on operating data with the first encrypting key to obtain cipher data, and sending an operating command comprising the cipher data to the authenticator; and S11) obtaining, by the authenticator, the cipher data in the operating command, obtaining a second encrypting key by performing computation with the second session key, decrypting the cipher data with the second encrypting key to obtain operating data, performing an operation corresponding to the operating data to obtain an operating result data, performing computation on the operating result data with the second encrypting key to obtain an operating response data, and sending an operating response comprising the operating response data to the client.

2. The method of claim 1, wherein, before Step S1, the method further comprises the following steps:

A1) sending, by the client, a request for building a pairing key to the server;

A2) generating, by the server, a client key pair, sending an extension register command to the authenticator via the client; the extension register command comprising a client version number and a client public key of the client key pair;

A3) obtaining, by the authenticator, the client version public key and the client version number in the extension register command, generating an authenticator key pair, and generating a second parameter according to the client public key and an authenticator private key of the authenticator key pair;

A4) obtaining, by the authenticator, a first preset data stored in the authenticator; generating a second initial pairing key according to the client public key, the authenticator public key of the authenticator key pair, the client version number, the first preset data and the second parameter, splitting the second initial pairing key to obtain a third key and a fourth key, and storing the third key and the fourth key correspondingly;

A5) sending, by the authenticator, an extension register response to the server via the client, the extension register response comprising the authenticator public key and the client version number;

A6) obtaining, by the server, the authenticator public key and the client version number in the extension register response, and generating a first parameter according to a client private key of the client key pair and the authenticator public key; and A7) obtaining, by the server, a first preset data stored in the server, generating a first initial pairing key according to the client public key, the authenticator public key, the client version number, the first preset data and the first parameter, splitting the first initial pairing key to obtain a first key and a second key, and storing the first key and the second key correspondingly.

3. The method of claim 1, wherein, generating the first client identification and the first authenticator identification according to a first key specifically is: generating, by the server, a first random number with a preset length, obtaining a stored first preset field and a stored second preset field, generating the first client identification according to the first random number, the first preset field and the first key, and generating the first authenticator identification according to the first client identification, the second preset field and the first key.

4. The method of claim 3, wherein generating the first client identification according to the first random number, the first preset field and the first key specifically is: concatenating, by the server, the first preset field and the first random number orderly, performing computation on the first preset field and the first random number with the first key according to a fourth preset algorithm to obtain a first data, and concatenating the first random number and the first data so as to obtain the first client identification.

5. The method of claim 3, wherein generating the first authenticator identification according to the first client identification, the second preset field and the first key specifically is: concatenating, by the server, the first client identification and the second preset field, performing computation on the first client identification and the second preset filed with the first key according to the fourth preset algorithm to obtain a third data, and taking a preset byte of the third data as the first authenticator identification.

6. The method of claim 3, wherein generating the first session key according to the second key specifically is: obtaining, by the server, a first preset data stored in the server, and performing computation on the first random number and the first preset data with the second key according to the third preset algorithm so as to obtain the first session key.

7. The method of claim 1, wherein verifying the first client identification according to the third key specifically is: obtaining, by the authenticator, a first preset field stored in the authenticator, the first random number and the first data in the first client identification, performing computation on the first preset field and the first random number with the third key according to the fourth preset algorithm so as to obtain a second data, then determining whether the second data and the first data are identical, if yes, verifying being successful, otherwise, verifying being failed.

8. The method of claim 1, wherein generating, by the authenticator, the second authenticator identification according to the third key specifically is: obtaining, by the authenticator, a second preset field stored in the authenticator, concatenating the first client identification and the second preset field orderly, performing computation on the first client identification and the second preset field with the third key according to the fourth preset algorithm to obtain a fourth data, taking a preset byte of the fourth data as a second authenticator identification.

9. The method of claim 1, wherein verifying the second authenticator identification specifically is: comparing, by the client, the second authenticator identification with the first authenticator identification, if they are identical, verifying being successful, otherwise, verifying being failed.

10. The method of claim 1, wherein in Step S5, notifying that the first client identification is verified successful, stopping scanning and broadcasting broadcast data comprising the second authenticator identification specifically comprises: building, by the authenticator, a Bluetooth connection with the client, when the Bluetooth connection is disconnected, the authenticator broadcasts broadcast data comprising the second authenticator identification.

11. A system for communicating with an authenticator, wherein the system comprises: a client, a server and the authenticator;
the client comprises:
a first module for sending a request for building session data to the server;
the server comprises:
a first module for obtaining a first key stored in the server itself to correspond to the client;
a first module for generating a first client identification and a first authenticator identification according to the first key;
in which the first module for obtaining is further configured to obtain a second key corresponding to the first key;
a second module for generating configured to generate a first session key according to the second key;
a second module for sending the first client identification, the first authenticator identification and the first session key to the client;
the client further comprises:
a first module for broadcasting data comprising the first client identification at a regular preset time period;
a first module for scanning and parsing to stop broadcasting, start scanning broadcast data sent from the authenticator, and parsing the broadcast data obtained by scanning;
a first module for verifying the second authenticator identification;
a third module for generating to obtain a first handshake key through computation via the first session key, and perform computation on client data via the first handshake key to obtain a client data digest value;
in which the first module for sending is further configured to send a handshake command comprising the client data and the client data digest value to the authenticator;
a second module for obtaining the authenticator data and the authenticator data digest value according to a handshake response;
a second module for verifying the authenticator data via the first handshake key, the authenticator data and the authenticator data digest value;
a module for encrypting and processing to obtain a first encrypting key by performing computation via the first session key, perform computation on operating data via the first encrypting key to obtain cipher data;
in which the first module for sending is further configured to send an operating command comprising the cipher data to the authenticator;

the authenticator comprises;
a second module for scanning broadcast data, and obtaining the first client identification from the broadcast data;
a third module for obtaining a third key stored in the third module itself;
a third module for verifying the first client identification according to the third key;
a fourth module for generating a second authenticator identification according to the third key;
in which the third module for obtaining is further configured to obtain a fourth key corresponding to the third key;
a fifth module for generating a second session key according to the fourth key;
a module for notifying verifying the first client identification is successful;
a second module for broadcasting configured to stop scanning and broadcast the broadcast data comprising the second authenticator identification;
in which the third module for obtaining is further configured to obtain the client data and the client data digest value according to the handshake command;
a sixth module for generating to obtain a second handshake key through computation via the second session key;
a fourth module for verifying the client data according to the second handshake key, the client data and the client data digest value;
a seventh module for generating configured to perform computation on the authenticator data via the second handshake key so as to obtain the authenticator data digest value;
a third module for sending a handshake response comprising the authenticator data and the authenticator data digest value to the client;
in which the third module for obtaining is configured to obtain cipher data in the operating command;
an eighth module for generating configured to perform computation via the second session key so as to obtain a second encrypting key;
in which the module for decrypting and processing configured to decrypt the cipher data via the second encrypting key to obtain operating data, perform operation corresponding to the operating data to obtain operating result data, and perform computation on the operating result data via the second encrypting key so as to obtain operating response data;
in which the third module for sending is further configured to send an operating response comprising the operating response data to the client.

12. The system of claim 11, wherein the server further comprises:
a first module for generating and sending configured to generate a client key pair, send an extension register command to the authenticator via the client, in which the extension register command comprises a client version number and a client public key in the client key pair;
a first module for obtaining and generating configured to obtain the authenticator public key and the client version number in an obtaining register response, and generate a first parameter according to the client private key of the client key pair and the authenticator public key;
in which the first module obtaining and generating is further configured to obtain a first preset data stored in itself, generate a first initial pair key according to the client public key, the authenticator public key, the client version number, the first preset data and the first parameter, split the first initial pair key to obtain the first key and the second key, and store the first key and the second key correspondingly;

the authenticator further comprises:

a second module for obtaining and generating configured to obtain a client public key and a client version number in the obtaining extension register command, generate an authenticator key pair, and generate a second parameter according to the client public key and an authenticator private key of the authenticator key pair;

in which the second module for obtaining and generating is further configured to obtain a first preset data stored in itself, generate a second initial pair key according to the client public key, the authenticator public key of the authenticator key pair, the client version number, the first preset data and the second parameter, split the second initial pair key so as to obtain a third key and a fourth key, and store the third key and the fourth key correspondingly;

in which the third module for sending is further configured to send an extension register response to the server via the client, in which the extension register response comprises the authenticator public key and the client version number.

13. The system of claim 11, wherein the first module for generating specifically comprises a first unit for generating and obtaining, a first unit for generating and a second unit for generating;

the first unit for generating and obtaining is configured to generate a first random number with a preset length, and obtain a first preset field stored and a second preset field stored;

the first unit for generating is configured to generate a first client identification according to the first random number, the first preset field and the first key;

the second unit for generating is configured to generate the first authenticator identification according to the first client identification, the second preset field and the first key.

14. The system of claim 13, wherein the first unit for generating is specifically configured to concatenate the first preset field and the first random number orderly, perform computation on the first preset field and the first random number via the first key to obtain a first data according to a fourth preset algorithm, and concatenate the first random number and the first data to obtain the first client identification.

15. The system of claim 13, wherein the second unit for generating is specifically configured to concatenate the first client identification and the second preset field orderly, perform computation on the first client identification and the second preset field via the first key according to the fourth preset algorithm to obtain third data, and take a preset byte of the third data as the first authenticator identification.

16. The system of claim 13, wherein the second module for generating specifically is configured to obtain first preset data stored in itself, perform computation on the first random number and the first preset data via the second key according to a third preset algorithm to obtain a first session key.

17. The system of claim 11, wherein the third module for verifying specifically is configured to obtain a first preset field stored in itself, the first random number and the first data in the first client identification, perform computation on the first preset field and the first random number via the third key according to the fourth preset algorithm to obtain second data, then determine whether the second data and the first data are identical.

18. The system of claim 11, wherein the fourth module for generating specifically is configured to obtain a second preset field stored in itself, concatenate the first client identification and the second preset field orderly, perform computation on the first client identification and the second preset field via the third key according to a fourth algorithm to obtain fourth data, and take a preset byte of the fourth data as the second authenticator identification.

19. The system of claim 11, wherein the first module for verifying specifically is configured to compare the second authenticator identification with the first authenticator identification, if they are identical, then verifying is successful, otherwise, verifying is failed.

20. The system of claim 11, wherein the module for notifying specifically is configured to build a Bluetooth connection with the client; so as to trigger the second module for broadcasting when the Bluetooth connection is disconnected.

* * * * *